United States Patent
Cole et al.

(10) Patent No.: US 10,668,413 B2
(45) Date of Patent: Jun. 2, 2020

(54) ELONGATE STRUCTURE

(71) Applicant: Z-FILTER PTY LTD, Canning Vale (AU)

(72) Inventors: Bradley James Cole, Atwell (AU); Neil Deryck Bray Graham, Coogee (AU)

(73) Assignee: Z-FILTER PTY LTD, Canning Vale (AU)

( * ) Notice: Subject to any disclaimer, the term of this patent is extended or adjusted under 35 U.S.C. 154(b) by 580 days.

(21) Appl. No.: 15/526,677

(22) PCT Filed: Nov. 16, 2015

(86) PCT No.: PCT/AU2015/000694
§ 371 (c)(1),
(2) Date: May 12, 2017

(87) PCT Pub. No.: WO2016/074026
PCT Pub. Date: May 19, 2016

(65) Prior Publication Data
US 2017/0312662 A1 Nov. 2, 2017

(30) Foreign Application Priority Data
Nov. 14, 2014 (AU) .................. 2014904590

(51) Int. Cl.
 *B01D 33/048* (2006.01)
 *B01D 33/04* (2006.01)
 (Continued)

(52) U.S. Cl.
 CPC ....... *B01D 33/0565* (2013.01); *B01D 33/048* (2013.01); *C02F 11/123* (2013.01);
 (Continued)

(58) Field of Classification Search
 CPC .............. B01D 33/0565; B01D 33/048; B01D 33/042; B01D 2033/052; F16G 3/07; F16G 3/14; C02F 11/123; B65G 15/40
 (Continued)

(56) References Cited

U.S. PATENT DOCUMENTS

| 3,642,142 A | 2/1972 | Barnebl et al. |
| 3,825,125 A | 7/1974 | Peterson et al. |

(Continued)

FOREIGN PATENT DOCUMENTS

| CN | 202597588 U | 12/2012 |
| GB | 571210 A | 8/1945 |

(Continued)

OTHER PUBLICATIONS

International Search Report and Written Opinion of the International Searching Authority issued in PCT/AU2015/000694, dated Jan. 25, 2016; ISA/AU.

(Continued)

*Primary Examiner* — Thomas M Lithgow
(74) *Attorney, Agent, or Firm* — Harness, Dickey & Pierce, P.L.C.

(57) ABSTRACT

An endless elongate structure adapted to circulate around a path. The endless elongate structure comprises a central longitudinal portion and two lateral longitudinal portions on opposed sides of the central longitudinal portion for supporting the central longitudinal portion therebetween. The central longitudinal portion and two lateral longitudinal portions are connected together by joiners. The central longitudinal portion is adapted to be assembled into a movable tubular formation which is adapted to be continuously assembled at one end thereof and continuously disassembled at another end thereof during movement of the elongate structure along the path. The central longitudinal (Continued)

portion has two longitudinal edge sections adapted to be releasably connected together for assembling the tubular formation by a slidably interlocking connector. The slidably interlocking connector is integrated with the two longitudinal edge sections by joiners.

26 Claims, 17 Drawing Sheets

(51) Int. Cl.
B01D 33/052 (2006.01)
B01D 33/056 (2006.01)
F16G 3/07 (2006.01)
F16G 3/14 (2006.01)
C02F 11/123 (2019.01)
B65G 15/40 (2006.01)

(52) U.S. Cl.
CPC .............. F16G 3/07 (2013.01); F16G 3/14 (2013.01); B01D 33/042 (2013.01); B01D 2033/052 (2013.01); B65G 15/40 (2013.01)

(58) Field of Classification Search
USPC .................................. 210/400, 401
See application file for complete search history.

(56) References Cited

U.S. PATENT DOCUMENTS

| 6,467,136 B1 | 10/2002 | Graham |
| 9,381,454 B2 * | 7/2016 | Graham ............... B65G 15/08 |
| 2009/0266686 A1 | 10/2009 | Lechner |
| 2013/0143705 A1 | 6/2013 | Wolf |

FOREIGN PATENT DOCUMENTS

| WO | WO-2007-143780 A1 | 12/2007 |
| WO | WO-2014-056036 A1 | 4/2014 |

OTHER PUBLICATIONS

International Preliminary Report on Patentability (Chapter II of the Patent Cooperation Treaty) issued in PCT/AU2015/000694), dated Jan. 31, 2017; IPEA/AU.

* cited by examiner

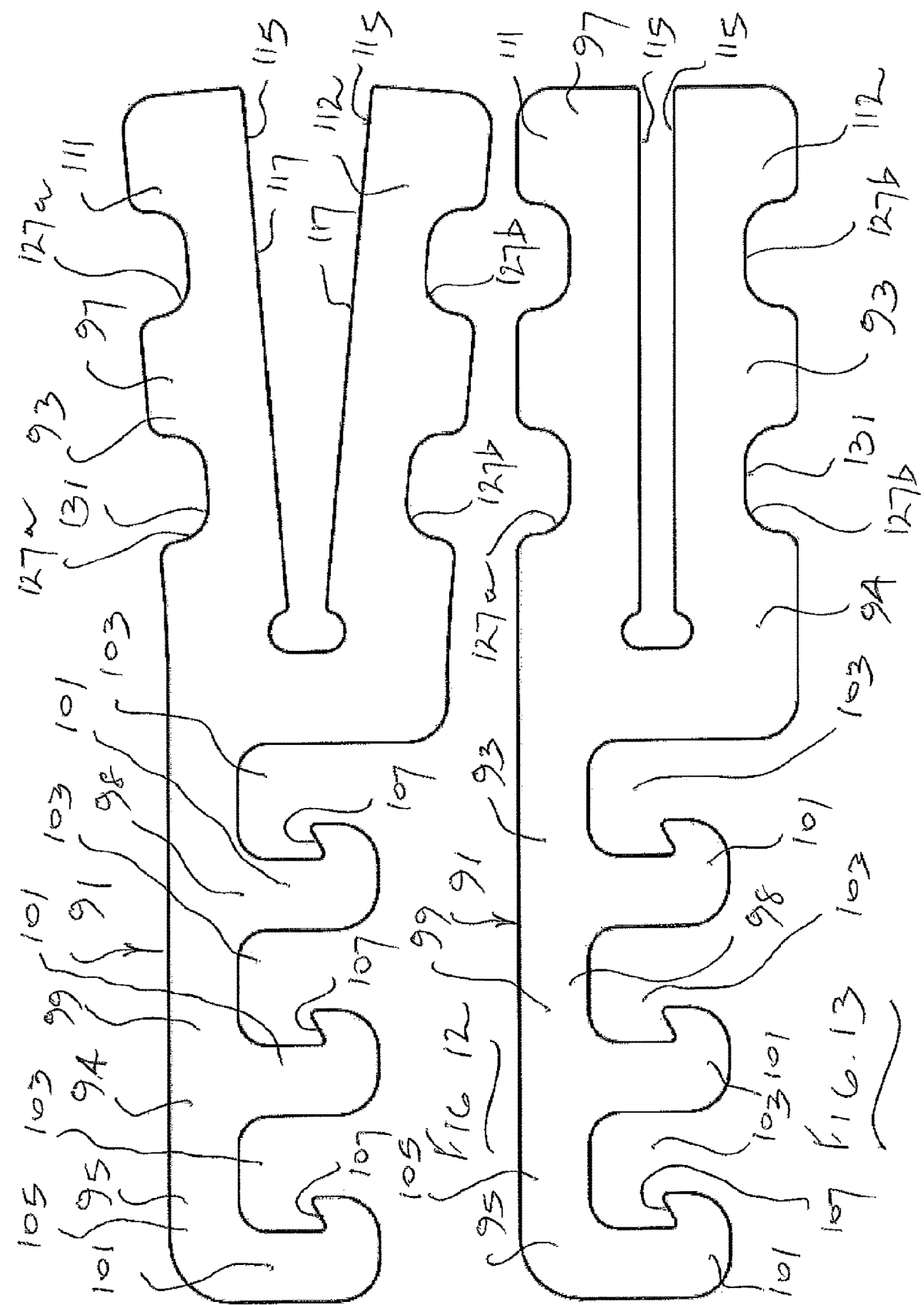

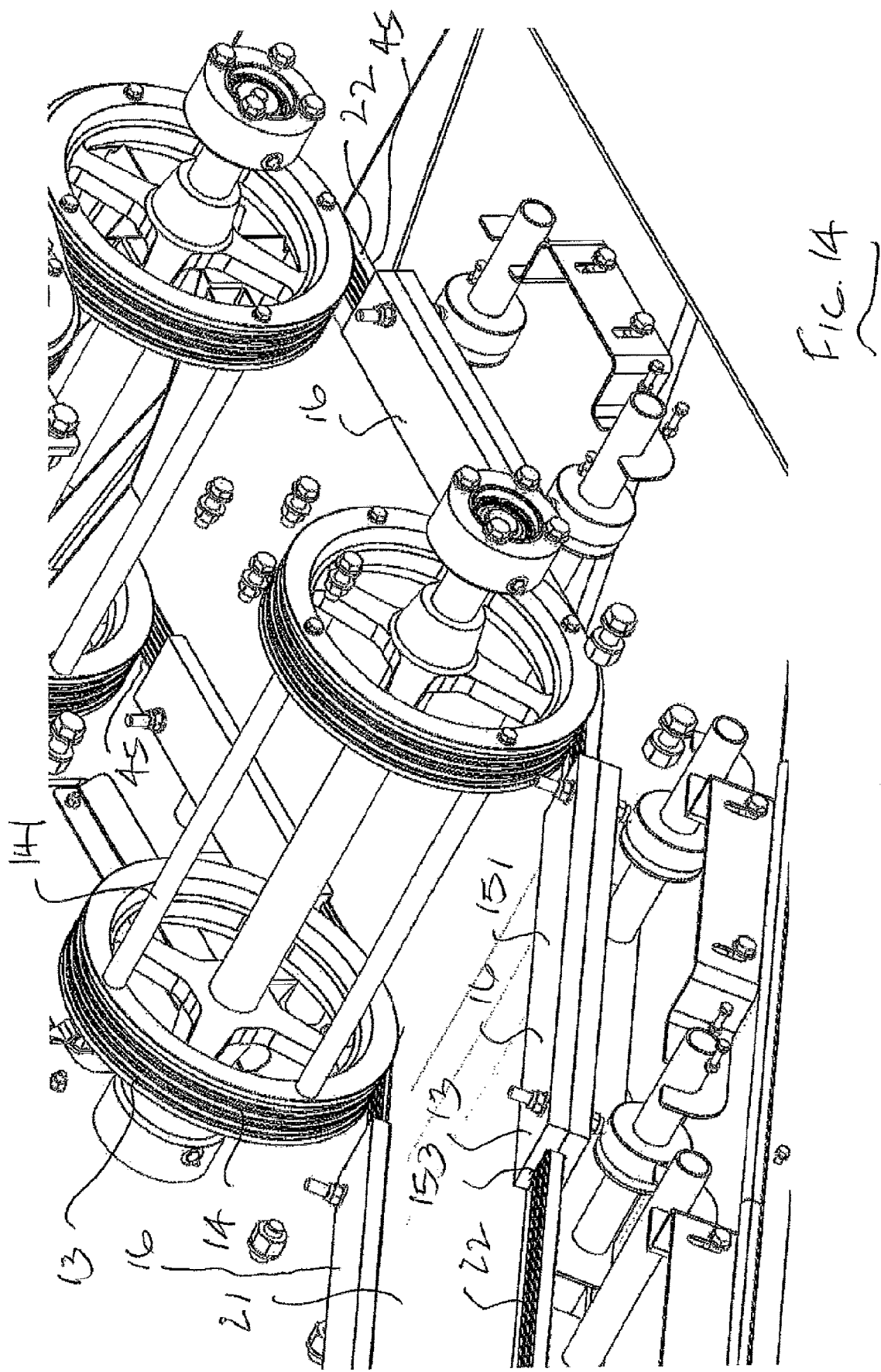

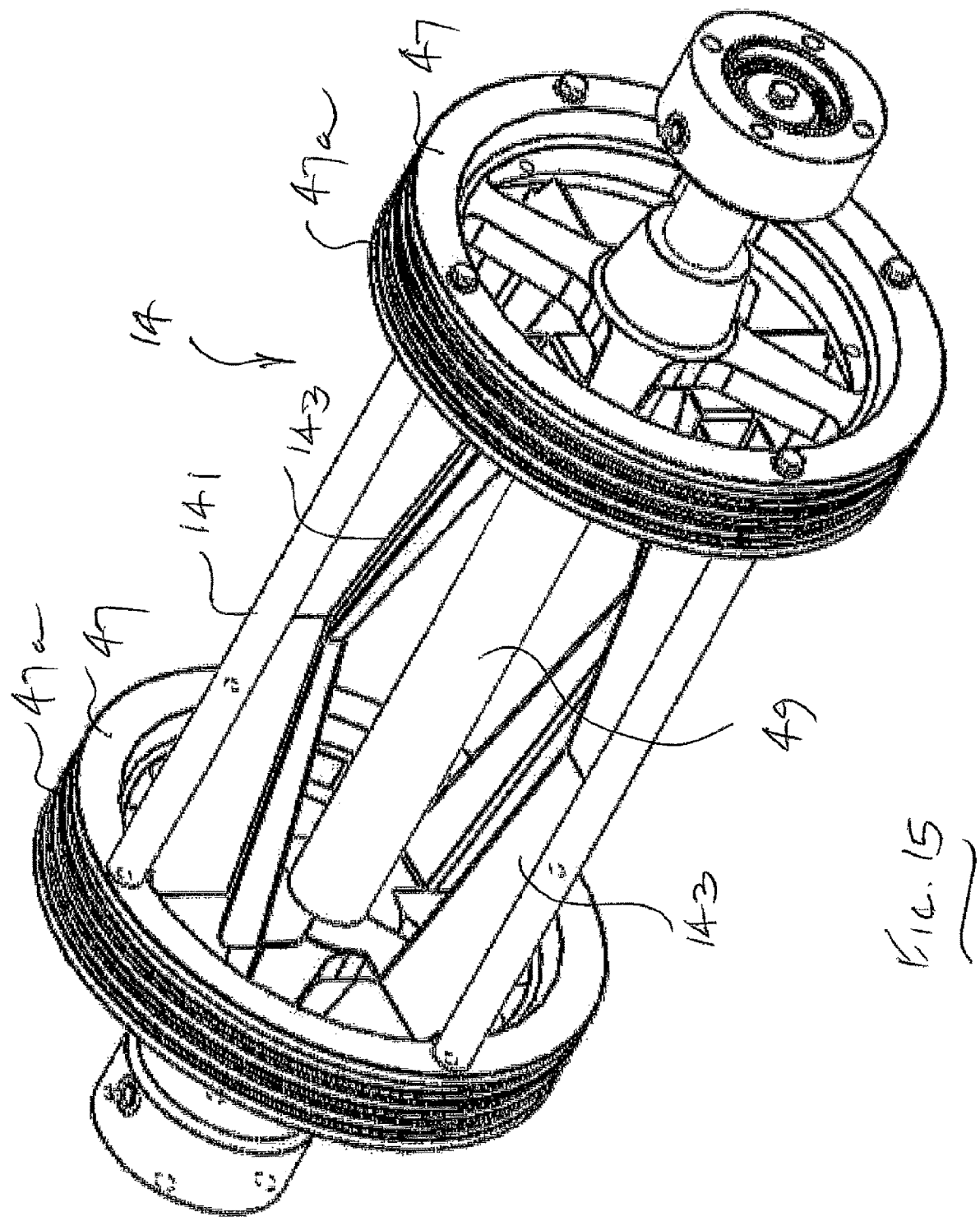

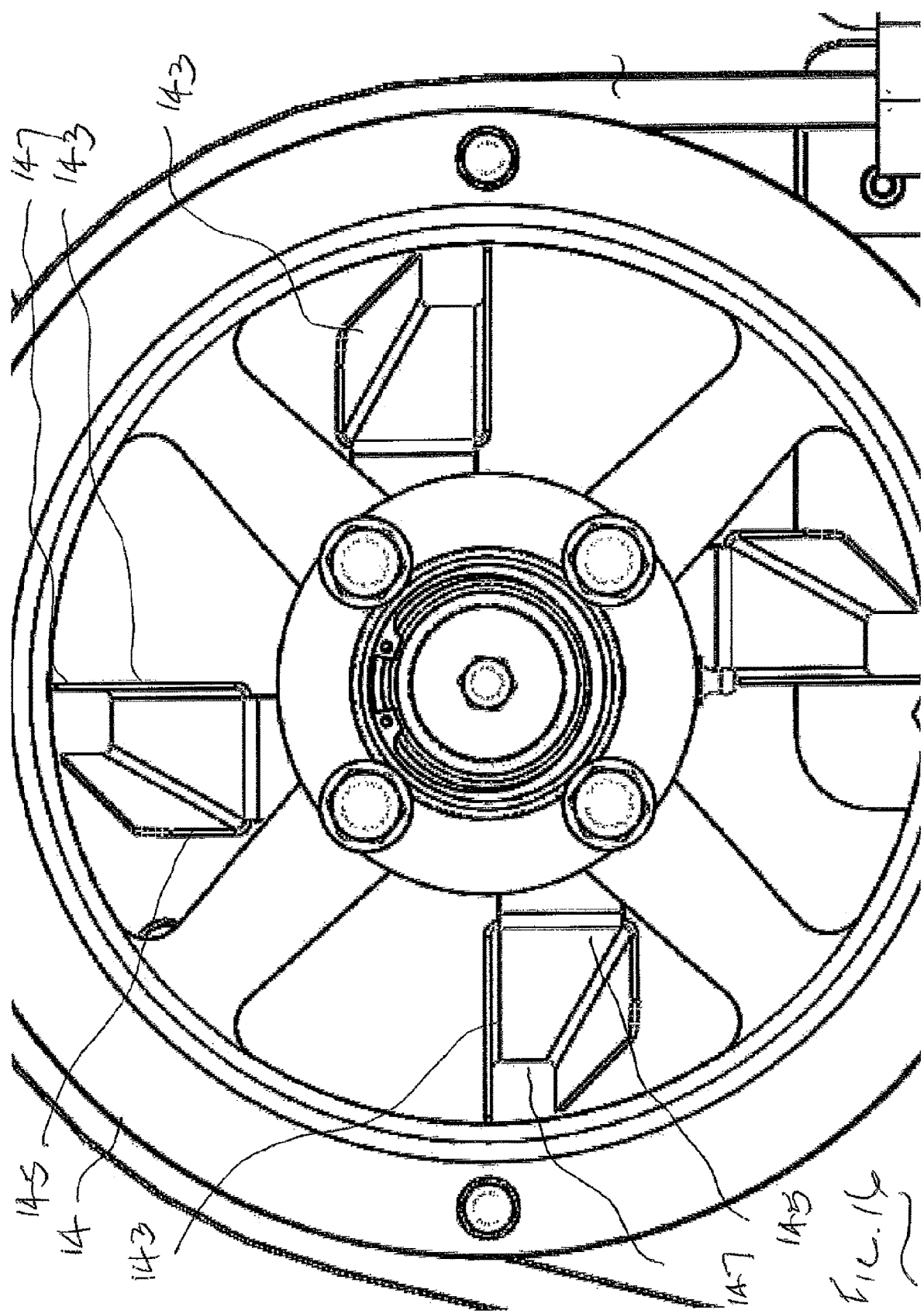

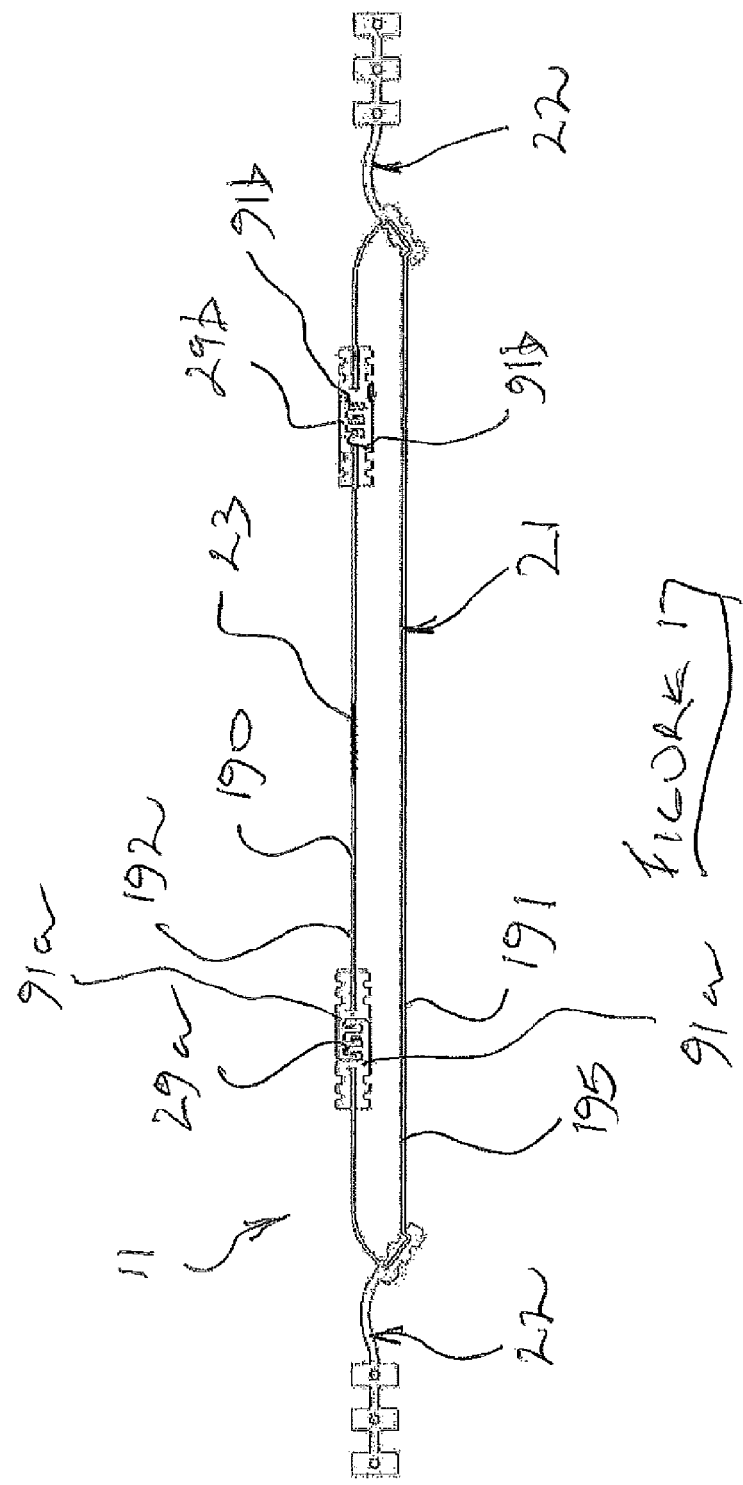

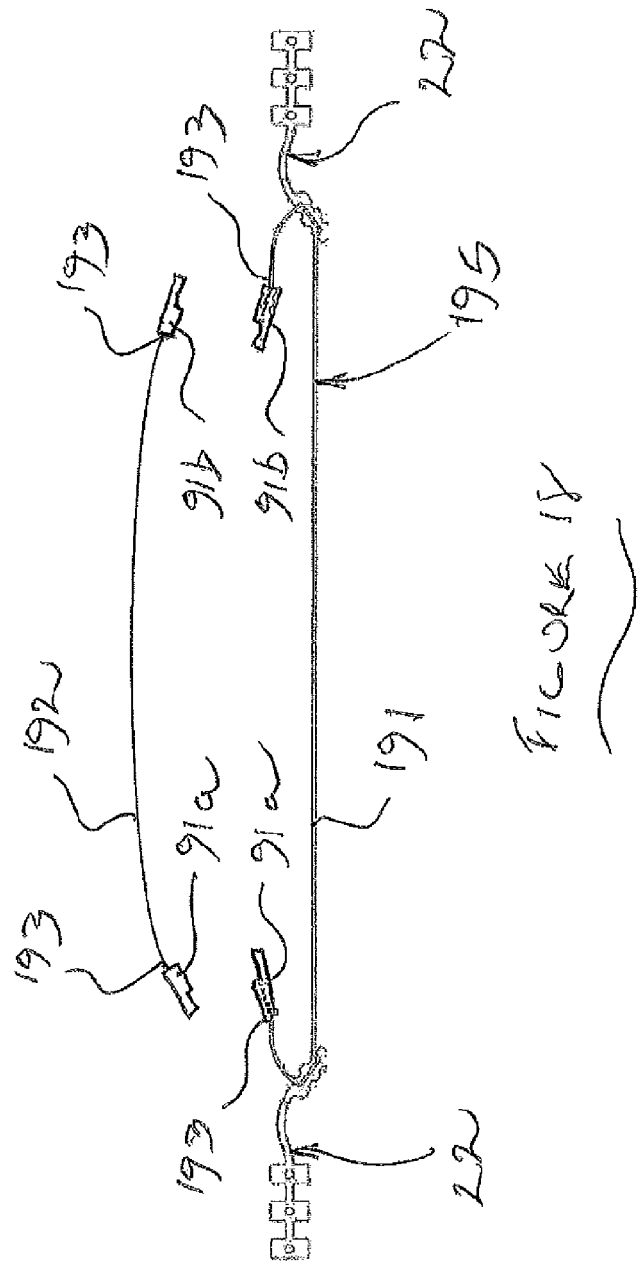

ELONGATE STRUCTURE

CROSS-REFERENCE TO RELATED APPLICATIONS

This application is a 371 U.S. National Stage of International Application No. PCT/AU2015/000694, filed on Nov. 16, 2015, which claims the benefit of and priority to Australian Patent Application No. 2014904590, filed on Nov. 14, 2014. The disclosures of the above applications are incorporated herein by reference.

TECHNICAL FIELD

This invention relates to an elongate structure movable along a path.

This invention more particularly relates to an elongate structure which is movable along a path and which is adapted to be assembled into a tubular formation, the tubular formation being adapted to be continuously assembled at one end thereof and continuously disassembled at another end thereof during movement of the elongate structure along the path.

The invention also relates to a joiner. The joiner may be used in the construction and operation of elongate structure, although it may have other applications.

The invention also relates to apparatus for performing an operation on a material(s) or goods, wherein the apparatus uses an elongate structure according to the invention.

The operation may be a handling and/or treatment operation of any appropriate type including, but not limited to, for example, a conveying operation in which material(s) or goods are transported from one location to another, a crushing operation, a filtering operation in which the material is separated into liquid and solid components, or any combination of two or more of such operations.

The apparatus has been devised particularly, although not solely, for crushing and filtering (dewatering) a water-laden sludge such as, for example, sewage, mining concentrates, mining wastes, ores, coal fines, tailings, wood pulp, paper pulp, agricultural products, wine grape mash/pulp, as well as separation of clays for brick manufacture, water filtration (for example, desalination of water), and filtration for aquaculture.

In addition to providing a means of conveyance for performing a transporting operation, the apparatus may provide a controlled means of crushing material and containing the crushings, resulting in the production of pulp. Additionally, the apparatus may provide a container to transport sludge or other material from one process bath to another.

BACKGROUND ART

The following discussion of the background art is intended to facilitate an understanding of the present invention only. The discussion is not an acknowledgement or admission that any of the material referred to is or was part of the common general knowledge as at the priority date of the application.

In the applicant's international application PCT/AU2007/000820 (WO 2007/143780), there is disclosed apparatus (described as belt filter apparatus) for treating material to separate solid and liquid components thereof. The apparatus comprises an endless elongate structure (described as a belt structure) adapted to circulate along a path incorporating guide roller structures around which the endless elongate structure passes. The endless elongate structure comprises an elongate belt portion formed of water permeable material. The belt portion has two opposed longitudinal edges. The endless belt structure further comprises a zipper for releasably connecting the two longitudinal edges together so as to form a tubular structure having a flexible side wall. The circulating path includes an assembly zone at which the longitudinal edges of the belt portion are brought together and interconnected by way of the zipper to form the tubular structure, and a disassembly zone at which the zipper is released to separate the longitudinal edges and the tubular structure subsequently opened.

The applicant has now devised an elongate structure which can be used, for example, as what is described as the belt structure in PCT/AU2007/000820 (WO 2007/143780) and which may provide improvements in construction of the belt structure, or at least a useful alternative in construction of the belt structure.

SUMMARY OF INVENTION

According to a first aspect of the invention there is provided an elongate structure movable along a path, the elongate structure having a central longitudinal portion and two lateral longitudinal portions on opposed sides of the central longitudinal portion for supporting the central longitudinal portion therebetween, and a joiner for connection to flexible material comprising the central longitudinal portion, the joiner comprising first and second joiner portions between which an associated portion of the flexible material is received and clamped.

The joiner may, in a first form, be provided in a connection between the central longitudinal portion and one of the lateral longitudinal portions. Preferably, this form of joiner is provided in a respective connection between the central longitudinal portion and each of the lateral longitudinal portions. In other words, there may be two of the joiners, each provided in a connection between the central longitudinal portion and a respective one of the two lateral longitudinal portions.

The joiner may be integrated in the connection between the central longitudinal portion and the respective lateral longitudinal portions.

The central longitudinal portion may be adapted to be assembled into a movable tubular formation, the tubular formation being adapted to be continuously assembled at one end thereof and continuously disassembled at another end thereof during movement of the elongate structure along the path, wherein the central longitudinal portion has longitudinal edge sections adapted to be releasably connected together for assembling the tubular formation by a slidably interlocking connector.

The joiner may, in a second form, be provided in a respective connection between one of the longitudinal edge sections of the central longitudinal portion and the slidably interlocking connector. Preferably, this form of joiner is provided in a respective connection between each of the longitudinal edge sections of the central longitudinal portion and the slidably interlocking connector.

The joiner may be integrated in the respective connection between each of the longitudinal edge sections of the central longitudinal portion and the slidably interlocking connector.

The central longitudinal portion may be configured as a flexible tube which can be split longitudinally for assembly and disassembly into and from the tubular formation, with respective longitudinal side sections of the tube being connected to the two lateral longitudinal portions.

The tube may be fabricated from one piece of flexible material, or from several pieces of flexible material connected together to provide a unitary structure. Where the tube is fabricated from several pieces of flexible material connected together to provide a unitary structure, the various pieces of flexible material may comprise the same type of material or different types of material.

The central longitudinal portion may be of integrated construction; that is, it may be formed as a unitary structure having two longitudinal edge sections adapted to be connected one to the other to provide the tubular formation. With this arrangement, there would be one slidably interlocking connector for releasably interconnecting the two longitudinal edge sections of the central longitudinal portion to provide the tubular formation. The slidably interlocking connector may comprise two connector elements each adapted to be connected to a respective one of the two longitudinal edge sections of the central longitudinal portion. The two connector elements are each provided with the joiner to establish a connection with the respective longitudinal edge section of the central longitudinal portion. When so connected, the slidably interlocking connector is integrated with the two longitudinal edge sections.

However, the central longitudinal portion need not necessarily be of integrated construction; that is, it need not be formed as a single unit unitary structure. The central longitudinal portion may, for example, comprises two or more discrete longitudinal parts adapted to be releasably connected one to another to provide the tubular formation. The discrete longitudinal parts may each have two longitudinal edge sections, the arrangement being such that discrete longitudinal parts can be disposed one alongside another to assemble the tubular formation, with adjacent longitudinal edge sections of the discrete longitudinal parts being interconnected by a respective slidably interlocking connector. The slidably interlocking connector may comprise two connector elements each adapted to be connected to a respective one of the two adjacent longitudinal edge sections.

The first and second joiner portions may be adapted to be secured together to clamp the associated portion of the flexible material therebetween.

With this arrangement, the first and second joiner portions may provide a clamping assembly in clamping engagement with the associated portion of the flexible material.

The joiner may further comprise securing means for securing the first and second joiner portions together to clamp the associated portion of the flexible material therebetween.

The securing means may be accommodated in a protected condition with respect to either one or both of the first and second joiner portions. The securing means may, for example, be accommodated within the confines of either one or both of the first and second joiner portions. In this way, the securing means is not exposed to, or is at least somewhat protected from, an adverse condition arising on the exposed side of the respective joiner portion. The adverse condition may, for example, comprise an aggressive fluid flow to which the joiner might be exposed or a surface relative to which the joiner might move and therefore be exposed to abrasion or wear.

The securing means may be recessed within the clamping assembly comprising the first and second joiner portions, thereby being within the confines of the first and second joiner portions.

The securing means may comprise fastening means between the first and second joiner portions.

The fastening means may comprise any appropriate form of joint for joining the first and second joint portions. The joint may, for example, comprise a stitched joint, a stapled joint, a riveted joint, a pinned joint, any other mechanically fastened joint, a bonded joint including a chemically-bonded joint, and a heat-welded joint.

The fastening means may comprise a joint extend continuously along at least a substantial part of the length of the clamping assembly comprising the first and second joiner portions, or it may comprise a plurality of joint elements provided at intervals along at least a substantial part of the length of the clamping assembly.

Where the fastening means is recessed within the clamping assembly comprising the first and second joiner portions, the clamping assembly may be provided with a longitudinally extending recess formation (such as a channel) in which the securing means is recessed.

The clamping assembly may be provided with two recess formations on opposed sides of the clamping assembly, with the fastening means extending between the two recess formations; that is, one recess formation may be provided on the first joiner portion and another recess formation may be provided on the second joiner portion, with the two recess formations providing a pair.

The clamping assembly may be provided with more than one pair of recess formations.

The recess formations may be defined between longitudinal ribs provided on the first portion and/or second portion. The ribs may be formed integrally with the first portion and/or second portion. The ribs may be profiled at their outer longitudinal edges; the profiling may, for example, comprise rounded longitudinal edges.

The arrangement involving one or more pairs of recessed formations is useful in circumstances where the fastening means comprises a stitched joint, as the first and second joint portions can be stitched together along the pair of joint formations, or along each pair of joint formations, as the case may be. This facilitates rapid assembly and installation of the joiner, with the stitched joint(s) being protected (against, for example, abrasion) by virtue of being recessed within the confines of the joiner.

The first portion and/or second portion may be formed with the recess formation(s) therein, such as for example by way of an extrusion process.

The first portion and second portion may be formed from an elastomeric material. The elastomeric material may comprise a material selected to provide durability while maintaining a flexible nature. One such material may comprise a thermo-plastic polyurethane, such as for example that manufactured or supplied by BASF Elastogran Germany.

In one embodiment, the first portion may define a groove and the second portion may define a counterpart strip, the arrangement being that the groove is configured to receive the strip. With this arrangement, a portion of the flexible material comprising the central longitudinal portion can be positioned between the strip and the groove, and the strip then inserted into the groove, thereby clamping the flexible material between the strip and the groove. Such an embodiment may constitute the joiner in said first form.

The first portion defining the groove may be integrated in each lateral longitudinal portion.

In another embodiment, the first and second portions may be configured as two jaws between which a portion of the flexible material comprising the central longitudinal portion may be inserted and clampingly engaged. The portion of the flexible material may comprise one of the longitudinal edge sections of the central longitudinal portion to which the slidably interlocking connector is connected. Such an embodiment may constitute the joiner in said second form.

The two jaws may each have an inner side presenting a clamping surface for engaging the inserted portion of the flexible material and an outer side provided with the recess formation(s).

The two jaws may be biased into an open condition for insertion of the portion of flexible material and adapted to be closed upon the inserted portion of the flexible material when the securing means is installed, with the securing means functioning to secure the two jaws together to clamp the inserted portion of the flexible material therebetween.

With this arrangement, the two jaws may be integrated with the slidably interlocking connector.

As discussed above, the joiner may be integrated in the connection or respective connection between the central longitudinal portion and each of the lateral longitudinal portions.

More particularly, the joiner may be integrated into each lateral longitudinal portion.

Each lateral longitudinal portion may comprise an elongate body having two opposed marginal edge sections. One marginal edge section of the elongate body may be configured as the joiner, and the other marginal edge section may be configured as a guide portion for guiding movement of the elongate structure along its path.

In relation to the marginal edge section configured as the joiner, the first joiner portion defining the groove may be integrated with the elongate body and the second joiner portion constituted by the counterpart strip may be formed separately. The strip may be positioned on one side of the flexible material at the intended point of attachment, and the strip then inserted into the groove, moving the associated portion of the flexible material into the groove and clamping it between the strip and the groove. Assembly and installation of the joiner can then be completed by fastening the first and second joiner portions together.

In relation to the other marginal edge section, the guide portion may be configured as a belt for engagement with a guide structure, such as for example a pulley or, more likely, a series of pulleys positioned at intervals along the path of movement of the elongate structure. The term pulley as used herein is taken to refer to any rotatable element or device or structure which engages the belt and provides support and/or guidance for the belt during movement, and optionally also drive to the belt for moving the elongate structure along the path. The term pulley as used herein is taken to include rollers, wheels, sprockets, cogs and other structures rotatable about an axis.

The belt may be of any appropriate configuration; for example, the belt may be configured as a flat belt, a ribbed belt, a multi-groove belt, or a configuration functioning as a positive transfer belt such as a toothed belt, or notch or cog belt.

Further, the guide portion may have two opposed sides for guiding movement of the elongate structure along its path. Where the guide portion is configured as a belt, the belt may have two opposed sides, each configured for engagement with a pulley.

Each lateral longitudinal portion may incorporate one or more longitudinal tensile elements. The tensile element(s) may be incorporated in the guide portion.

The elongate body may further comprise an intermediate section between the two opposed marginal edge sections.

The intermediate section may be configured as a web.

The intermediate section may be configured for facilitate drainage of fluid therethrough. Where, for example, the intermediate section is configured as a web, drainage holes may be provided in the web.

Preferably, the intermediate section is capable of flexing to accommodate angular movement between the two marginal edge sections. Where, for example, the intermediate section is configured as a web, the web may be flexible so as to function as a plastic hinge to permit angular movement between the two marginal edge sections. In other words, the intermediate section may define a plastic hinge between the two opposed marginal edge sections.

The capacity to accommodate angular movement between the two marginal edge sections is advantageous as it accommodates angular movement of the joiner upon assembly and disassembly of the tubular formation. It may also assist in cushioning vibration in the moving tubular formation while carrying a load therein.

Preferably, the elongate body is of unitary construction to provide the two opposed marginal edge sections and the intervening intermediate section as a unit. The elongate body of unitary construction may be formed in any appropriate way, such as for example by way of an extrusion process.

As discussed above, the central longitudinal portion has longitudinal edge sections adapted to be releasably connected together for assembling the tubular formation by the slidably interlocking connector.

The slidably interlocking connector may comprise two connector elements each adapted to be connected to a respective one of the longitudinal edge sections of the central longitudinal portion. The two connector elements may each be provided with one of the joiners to establish a connection with a respective one of the longitudinal edge sections of the central longitudinal portion.

The two connector elements may each comprise an elongate body having two opposed marginal edge sections. One marginal edge section of the elongate body may be configured as a connector portion, and the other marginal edge section may be configured as the joiner.

The respective connector portions of the two connector elements are adapted for slidable interlocking engagement in a manner somewhat akin to a zipper. With this arrangement, the slidably interlocking connector may comprise a flexible, continuous plastic zipper.

In one arrangement, the two connector portions for interlocking engagement one with another are identical to each other or at least substantially similar. With this arrangement, the two connector elements may be identical or at least substantially similar. It is advantageous for the two connector elements to be identical, as it is would then require only production of one configuration of connector element, with that configuration then being used for each of the two required connector elements. However, it should be understood that the two connector elements need not be identical or substantially similar, but nevertheless have complementary portions for interlocking engagement one with another.

In an arrangement in which the two connector elements are identical or at least substantially similar, with connector portions for interlocking engagement one with another, each connector portion may comprise an elongate connector body portion, the elongate connector body portion comprising a plurality of longitudinal male portions in laterally spaced relation and a plurality of longitudinal female portions, each longitudinal female portion being disposed adjacent a respective one of the longitudinal male portions, wherein the male portions of each one of the connector portions can be slidably received in counterpart female portions of the other one of the connector portions whereby the male portions of the two connector portion are disposed one adjacent another and in interlocking engagement.

The elongate connector body portion may further comprise a base portion supporting the plurality of longitudinal male portions and from which the longitudinal male portions project.

Each male portion may present a locking edge extending into the adjacent female portion, whereby the locking edges of each two counterpart male portions in interlocking engagement engage one against the other to resist separation of the two interlocking connector elements.

The locking edge on each male portion may extend inwardly into the adjacent female portion in a direction towards the base portion adjacent the female portion.

The male portions may be resiliently flexible laterally to facilitate insertion of the male portions of each one of the connector portions in counterpart female portions of the other one of the connector portions.

It should be understood that the slidably interlocking connector progressively connects and disconnects the longitudinal edge sections of the central longitudinal portion as the tubular formation is continuously assembled at one end thereof and continuously disassembled at another end thereof during movement of the elongate structure along the path. Because of this, the two connector elements are not in interlocking engagement over their entire lengths at any time, but rather have sections thereof in interlocking engagement along part of the length, with the interlocking commencing at about the assembly end of the tubular formation and terminating at about the disassembly end of the tubular formation.

In relation to the marginal edge section of the elongate body configured as the joiner, the first and second portions of the joiner may be configured as two jaws between which a portion of the flexible material comprising the central longitudinal portion may be inserted and clampingly engaged. The portion of the flexible material may comprise one of the longitudinal edge sections of the central longitudinal portion to which the slidably interlocking connector is connected.

The two jaws may each have an inner side presenting a clamping surface for engaging the inserted portion of the flexible material and an outer side provided with the recess formation(s). The recess formations on the two jaws are provided as counterparts which function as a pair. The jaws may be provided with more than one pair of recess formations.

As alluded to previously, the fastening means may comprise any appropriate form of joint for joining the two jaws; including, for example, a stitched joint recessed between the pair of recess formations or a stitched joint recessed between each pair of recess formations where there is more than one pair of recess formations. In this way, the stitched joint, or other fastening means as the case may be, is not exposed to, or is at least somewhat protected from, an adverse condition arising on the exposed side of the slidably interlocking connector which might, for example, cause abrasion or wear.

The two jaws may be biased into an open condition for insertion of the portion of flexible material and adapted to be closed upon the inserted portion of the flexible material when the securing means is installed, with the securing means functioning to secure the two jaws together to clamp the inserted portion of the flexible material therebetween.

Preferably, the elongate body of each connector element is of unitary construction to provide the two opposed marginal edge sections as a unit. The elongate body of unitary construction may be formed in any appropriate way, such as for example by way of an extrusion process.

The path along which the endless structure is movable may comprise an endless path, and the elongate structure may be configured as an endless loop movable around the endless path. In one arrangement, the elongate structure may be fabricated in the form of the endless loop. In another arrangement the elongate structure may have be adapted to be assembled into an endless loop. By way of example, the elongate structure may comprise one or more sections connected together to form the endless loop. The elongate structure may be configured as linear structure having two opposed end sections adapted to be connected together to form the endless loop, or the elongate structure may be configured as a plurality of segments having opposed end sections adapted to be connected one to another in series to form the endless loop.

The flexible material may be selected according to the intended application of the elongate structure.

The flexible material may comprise a fluid permeable sheet material, such as for example a flexible filter pad material such as woven polypropylene According to a second aspect of the invention there is provided an elongate structure movable along a path, the elongate structure having a central longitudinal portion, two lateral longitudinal portions on opposed sides of the central longitudinal portion for supporting the central longitudinal portion therebetween, and a joiner providing a connection between flexible material comprising the central longitudinal portion and one of the lateral longitudinal portions, the joiner comprising first and second joiner portions between which an associated portion of the flexible material is received and clamped, said one lateral longitudinal portion comprising an elongate body having two opposed marginal edge sections, one marginal edge section being configured as the joiner and the other marginal edge section being configured as a guide portion for guiding movement of the elongate structure along a path, the guide portion having two opposed sides for guiding movement of the elongate structure along the path, each opposed side comprising a plurality of guide ribs.

According to a third aspect of the invention there is provided an elongate structure movable along a path, the elongate structure having a central longitudinal portion and two lateral longitudinal portions on opposed sides of the central longitudinal portion for supporting the central longitudinal portion therebetween, and a respective joiner providing a connection between flexible material comprising the central longitudinal portion and each lateral longitudinal portion, the joiner comprising first and second joiner portions between which an associated portion of the flexible material is received and clamped, each lateral longitudinal portion comprising an elongate body having two opposed marginal edge sections, one marginal edge section being configured as the joiner and the other marginal edge section being configured as a guide portion for guiding movement of the elongate structure along a path, the guide portion being configured as a double-sided ribbed belt.

According to a fourth aspect of the invention there is provided an elongate body having two opposed marginal edge sections, one marginal edge section comprising a joiner comprising first and second joiner portions between which flexible material can be received and clamped and the other marginal edge section comprising a guide portion for guiding movement of the elongate body along a path.

In relation to the marginal edge section configured as the joiner, the first joiner portion may define a groove integrated with the elongate body and the second joiner portion may comprise a counterpart strip formed separately.

In relation to the other marginal edge section, the guide portion may be configured as a belt for engagement with a pulley or, more likely, a series of pulleys positioned at intervals along the path of movement of the elongate structure.

The other marginal edge section of the elongate body according to the fourth aspect of the invention may have any one or more features of the guide portion discussed above in relation to the first aspect of the invention, either alone or in any combination.

According to a fifth aspect of the invention there is provided apparatus for performing an operation on matter, the apparatus comprising an elongate structure according to the first, second or third aspect of the invention.

The operation may be performed on matter introduced into the tubular formation.

The operation may comprise a handling and/or treatment operation of any appropriate type including, for example, a conveying operation in which the material is transported from one location to another, a crushing operation, a filtering operation in which the material is separated into liquid and solid components, or any combination of two or more of such operations.

The matter may comprise a fluid material and the operation may comprise separating liquid from solid matter within the fluid material.

The tubular formation may be permeable to liquid for separation of liquid from solid matter within the fluid material.

With this arrangement, the permeable tubular formation may provide a selective barrier through which liquid can pass but through which at least some of the solid matter cannot pass.

Where the solid matter comprises solid particulate matter, particulate solids of a size which can pass through the barrier may be deemed undersize solids and particulate solids which cannot pass through the barrier may be deemed oversize solids.

It is likely that the separation will not be entirely complete; that is, the separated solids will likely be contaminated with some liquid, and the liquid from which the solids have been separated will likely contain some remnant solids, typically undersize solids.

Preferably, the apparatus further comprises means for introducing material on which the operation is to be performed into the tubular formation.

Preferably, the apparatus further comprises means for compressing the tubular formation along a portion thereof. This may be for the purpose of compacting the material, pumping the material along the tubular structure or a combination of compacting and pumping actions. The compaction may be for the purpose of expressing liquid from material contained in the tubular structure.

According to a sixth aspect of the invention there is provided an apparatus for performing an operation on matter, the apparatus comprising an elongate structure, and guide structures for guiding the elongate structure about an endless path, wherein the elongate structure comprises a central longitudinal portion and two lateral longitudinal portions on opposed sides of the central longitudinal portion for supporting the central longitudinal portion therebetween, each lateral longitudinal portion comprising an elongate body having two opposed marginal edge sections, one marginal edge section being connected to the central longitudinal portion and the other marginal edge section being configured as a guide portion for guiding movement of the elongate structure along the endless path, the guide portion having two opposed sides for guiding movement of the elongate structure along the path, each side comprising a plurality guide ribs, and wherein the guide structures comprises at least one pulley structure over or around which the elongate structure is movable, the pulley structure comprising a plurality of peripheral grooves configured to receive the guide ribs on one side of the respective guide portion of the elongate structure, the peripheral grooves and guide ribs being so sized as to permit some lateral movement therebetween.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which:

FIG. 12 is an end view of a connector element forming part of the slidable interlocking connector shown in FIGS. 10 and 11, with a joiner forming part thereof defined by two jaws depicted in an open condition;

FIG. 13 is a view similar to FIG. 12, except that the two jaws are depicted in a closed condition;

FIG. 14 is a fragmentary perspective view of the apparatus shown in FIG. 1, illustrating in particular guide structures for the endless elongate structure as it circulates about an endless path;

FIG. 15 is a perspective view of a pulley wheel structure which provides one of the guide structures;

FIG. 16 is a fragmentary end view of the pulley wheel structure shown in FIG. 15;

FIG. 17 is cross-sectional view of a second embodiment of the elongate structure, shown assembled into a tubular formation; and FIG. 18 is a cross-sectional view of the elongate structure shown in FIG. 17, shown in a disassembled condition.

In the drawings like structures are referred to by like numerals throughout the several views. The drawings shown are not necessarily to scale, with emphasis instead generally being placed upon illustrating the principles of the present invention.

The figures depict several embodiments of the invention. The embodiments illustrates certain configurations; however, it is to be appreciated that the invention can take the form of many configurations, as would be obvious to a person skilled in the art, whilst still embodying the present invention. These configurations are to be considered within the scope of this invention.

DESCRIPTION OF EMBODIMENT

In the following detailed description, the present invention is described in connection with several preferred embodiments. However, to the extent that the following description is specific to a particular embodiment or a particular use of the present techniques, it is intended to be illustrative only and merely provides a concise description of the exemplary embodiment. Accordingly, the present invention is not limited to the specific embodiments described below, but rather; the invention includes all alternatives, modifications, and equivalents falling within the true scope of the appended claims.

Figure 1:
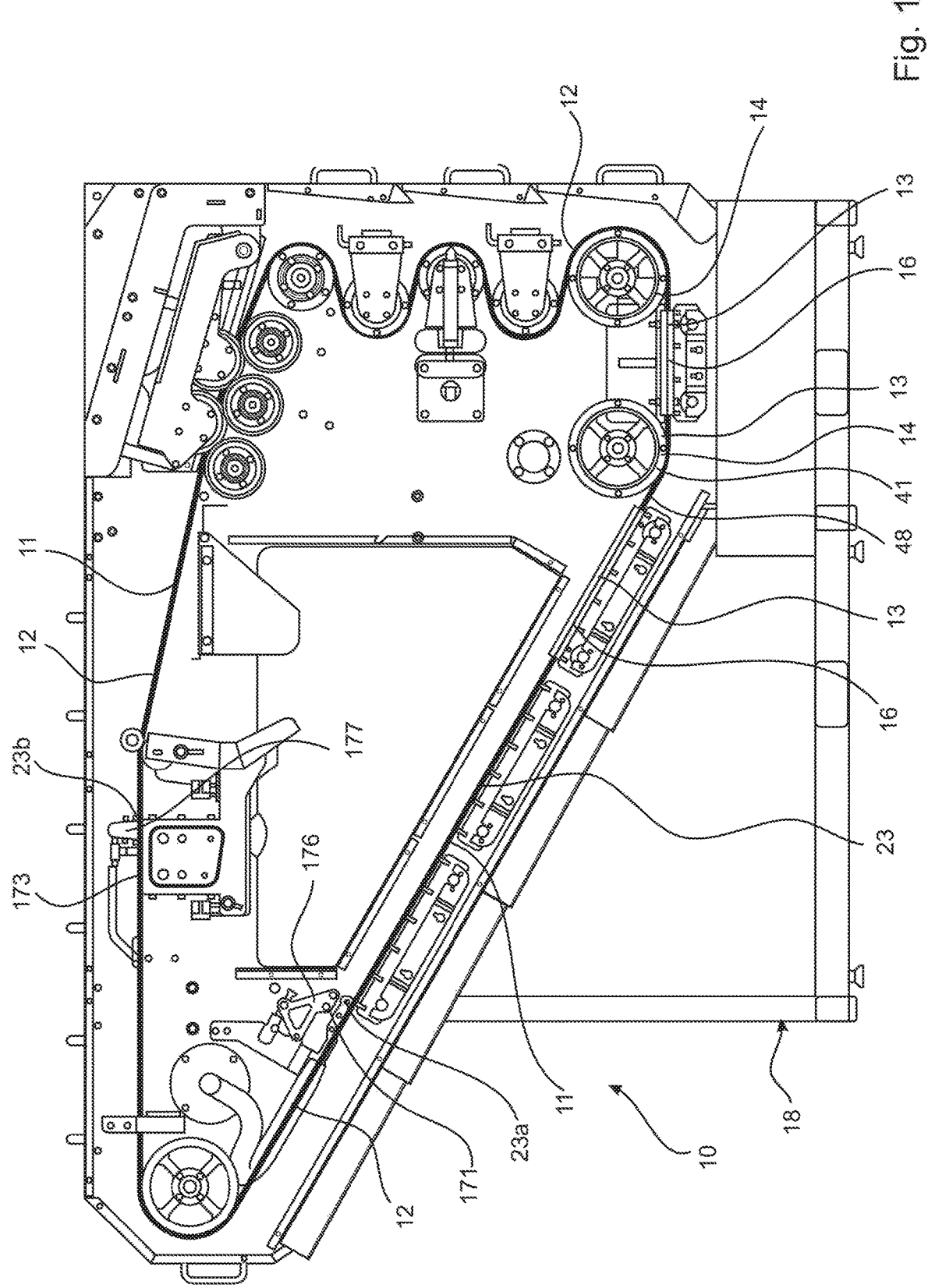
FIG. 1 is a schematic view of apparatus incorporating a first embodiment of an endless elongate structure.
Figure 2:
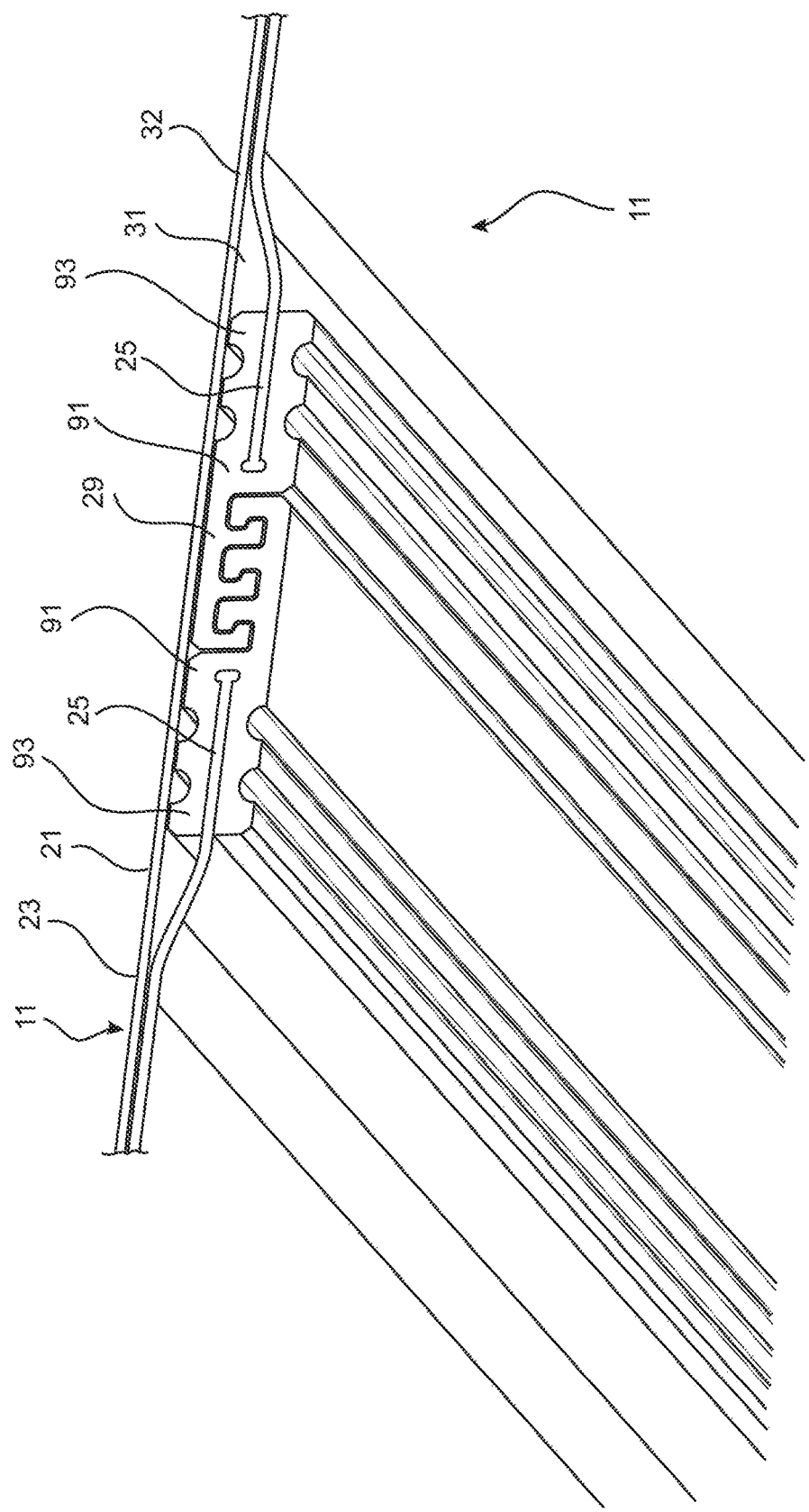
FIG. 2 is a cross-sectional fragmentary perspective view of the first embodiment of the elongate structure assembled into a tubular formation depicted in a collapsed condition.

In FIG. 1 of the drawings, there is shown an apparatus 10 for treating material to separate solid and liquid components thereof. The apparatus 10 has been devised particularly for treating sludge material such as sewage for the purposes of dewatering the sludge material to facilitate recovery of the solid matter for subsequent treatment. There may, of course, be various other applications for the apparatus 10.

The apparatus 10 comprises an endless elongate structure 11 adapted to circulate around a path 12 incorporating guide structures 13 for guiding the endless elongate structure 11 along the path 12.

The guide structures 13 comprises pulleys structures 14 over and around which the elongate structure 11 can pass and guide track structures 16 for guiding movement of the elongate structure 11 to maintain its alignment and position along the path 12.

In the arrangement shown in FIG. 1, the endless structure 11, the guide structures 13 and other componentry are supported within a mobile frame structure 18. Other arrangements are of course possible, including for example the endless structure 11, the guide roller structures 13 and other componentry being supported within a fixed installation.

In this embodiment, the apparatus 10 is of a configuration and size to facilitate transportation to and from a site of intended use, and to be manoeuvred around the site. Specifically, this embodiment of the apparatus 10 is about 2100 mm high, 700 mm wide and of a weight less than two tonnes. These size and weight specifications are provided for illustrative purposes only. The apparatus 10 is, of course, not limited to these size and weight specifications and can be of any size and weight as may be necessary.

The endless elongate structure 11 comprises a central longitudinal portion 21 and two lateral longitudinal portions 22 on opposed sides of the central longitudinal portion for supporting the central longitudinal portion therebetween. The central longitudinal portion 21 is adapted to be assembled into a movable tubular formation 23, which is adapted to be continuously assembled at one end 23a thereof and continuously disassembled at another end 23b thereof during movement of the elongate structure 11 along the path.

The central longitudinal portion 21 has two longitudinal edge sections 25 adapted to be releasably connected together for assembling the tubular formation 23 by a slidably interlocking connector 29. The slidably interlocking connector 29 is integrated with the two longitudinal edge sections 25, as will be described later.

With this arrangement, the central longitudinal portion 21 is configured as a flexible tube 31 which is split longitudinally for assembly and disassembly into and from the tubular formation 23, with respective longitudinal side sections 31a, 31b of the tube 31 being connected to the two lateral longitudinal portions 22.

In this first embodiment, central longitudinal portion 21 is of integrated construction; that is, it is formed as a unitary structure having the two longitudinal edge sections 25 adapted to be connected one to the other to provide the tubular formation 23.

In the arrangement shown, the tube 31 is fabricated from one piece of flexible material 32. However, the tube 31 may be fabricated from several pieces of flexible material connected together to provide a unitary structure. Where the tube is fabricated from several pieces of flexible material connected together to provide a unitary structure, the various pieces of flexible material may comprise the same type of material or different types of material.

In this embodiment, the flexible material 32 from which the tube 31 is fabricated comprises fluid permeable sheet material, such as for example a flexible filter pad material such as woven polypropylene. More particularly, in this embodiment, which involves dewatering sludge material, the flexible material 32 from which the tube 31 is fabricated comprises water permeable sheet material.

Each lateral longitudinal portion 22 comprises an elongate body 40 having two opposed marginal edge sections 41, 42, and an intermediate section 43 between the two opposed marginal edge sections. One marginal edge section 41 of the elongate body 40 is integrated with the central longitudinal portion 21, as will be described later, and the other marginal edge section 42 is configured as a guide portion 44 for guiding movement of the elongate structure 11 along its path.

The guide portion 44 is configured as a belt 45 for engagement with the guide structures 13 positioned at intervals along the path 12 of movement of the elongate structure 11. In the arrangement shown, the pulley structures 14 may comprise pulley wheels 47 mounted as a pair 48 on a common axle 49, with one pulley wheel 47 of each pair 48 being associated with a respective one of the two lateral longitudinal portions 22.

In the arrangement shown, each belt 45 is configured as a double-sided ribbed belt, although other configurations are possible including a flat belt, a multi-groove belt, or a configuration functioning as a positive transfer belt such as a toothed, notch or cog belt.

The belt 45 is double-sided in that it has two opposed sides 45a, 45b, each configured for engagement with respective pulley wheels 47 according to the respective side of the belt on which the pulley wheels are disposed.

Figure 6:
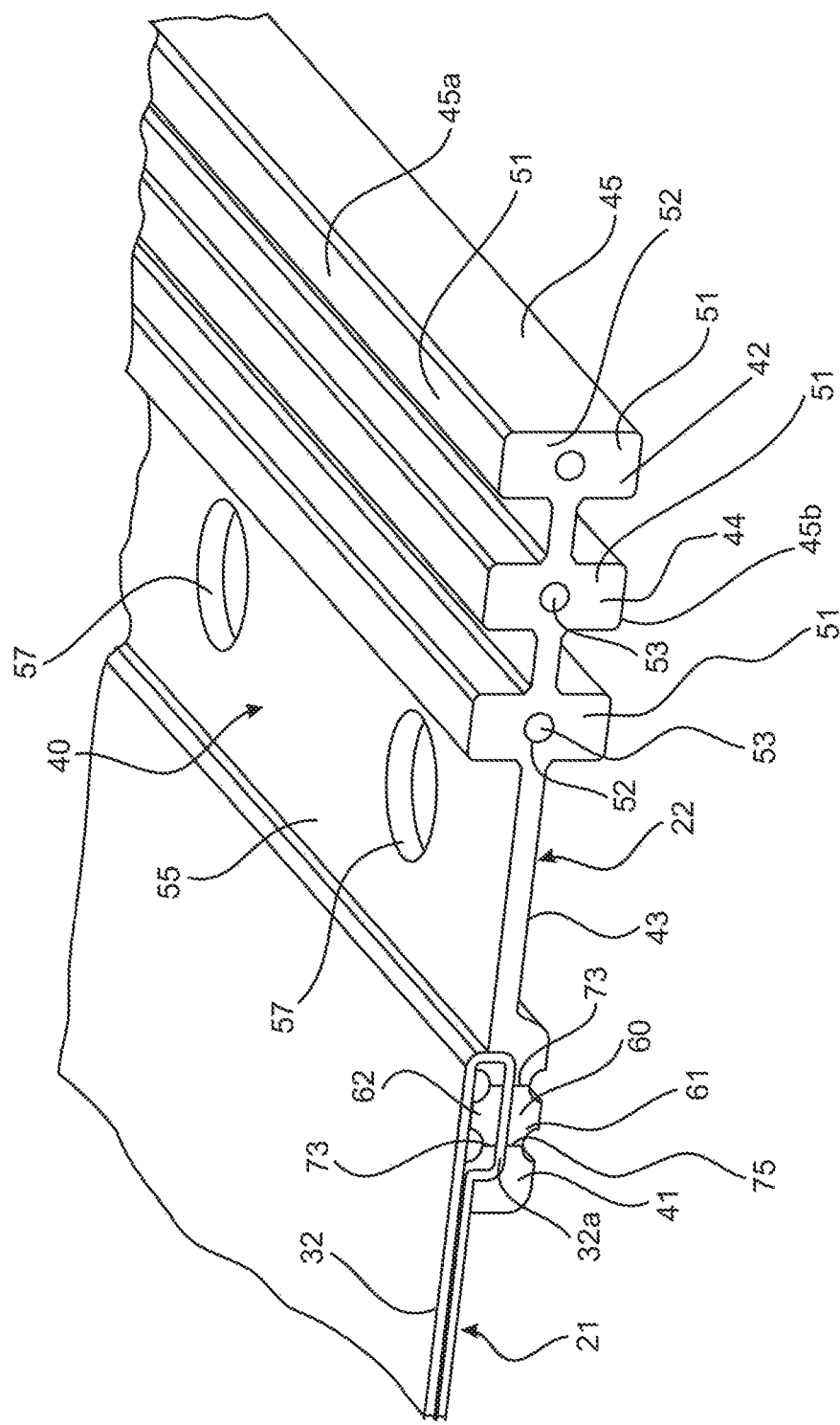
FIG. 6 is a cross-sectional fragmentary perspective view of the elongate structure, illustrating in particular one lateral longitudinal portion connected to the central longitudinal portion.
Figure 7:
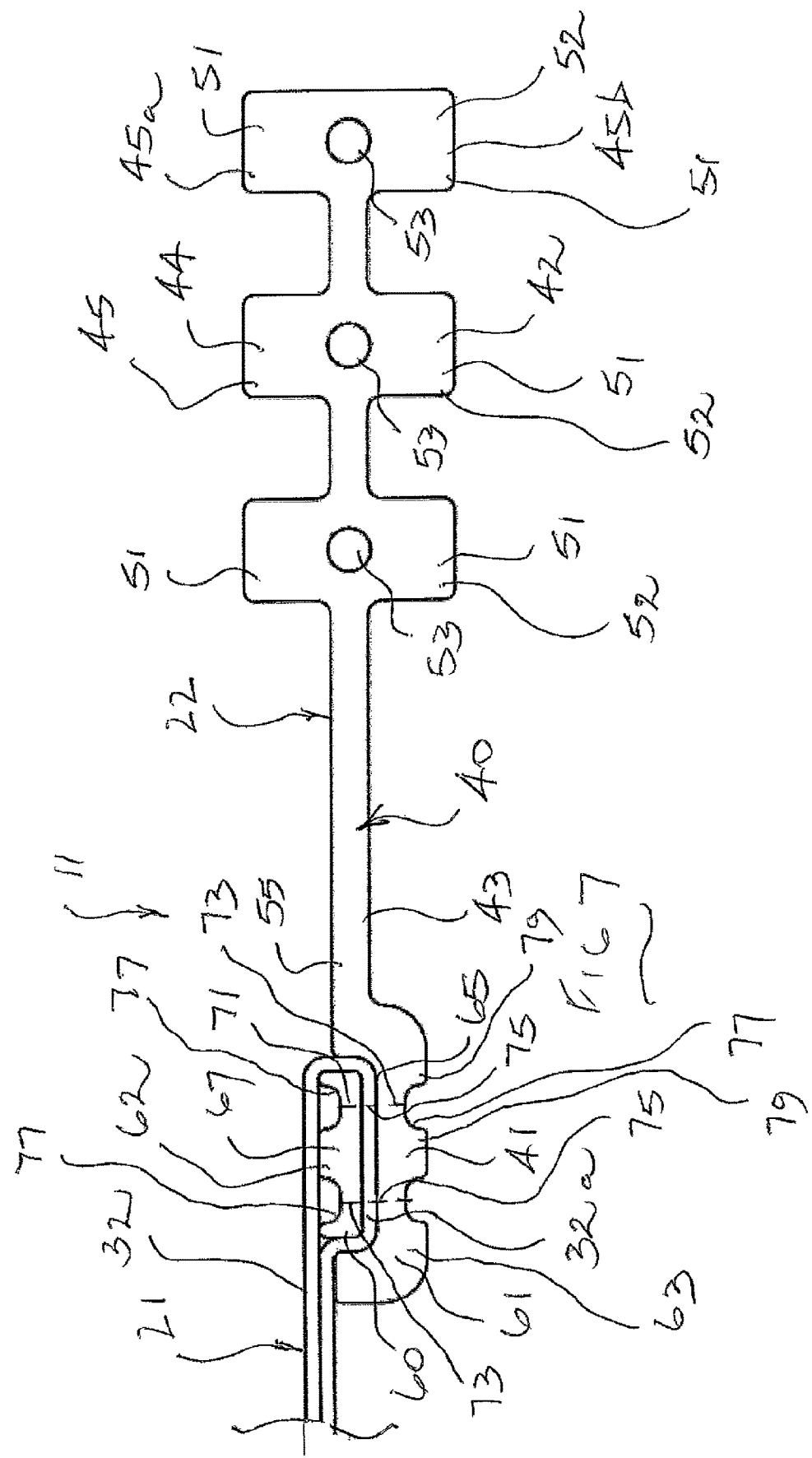
FIG. 7 is an end view of the arrangement shown in FIG. 6.
Figure 8:
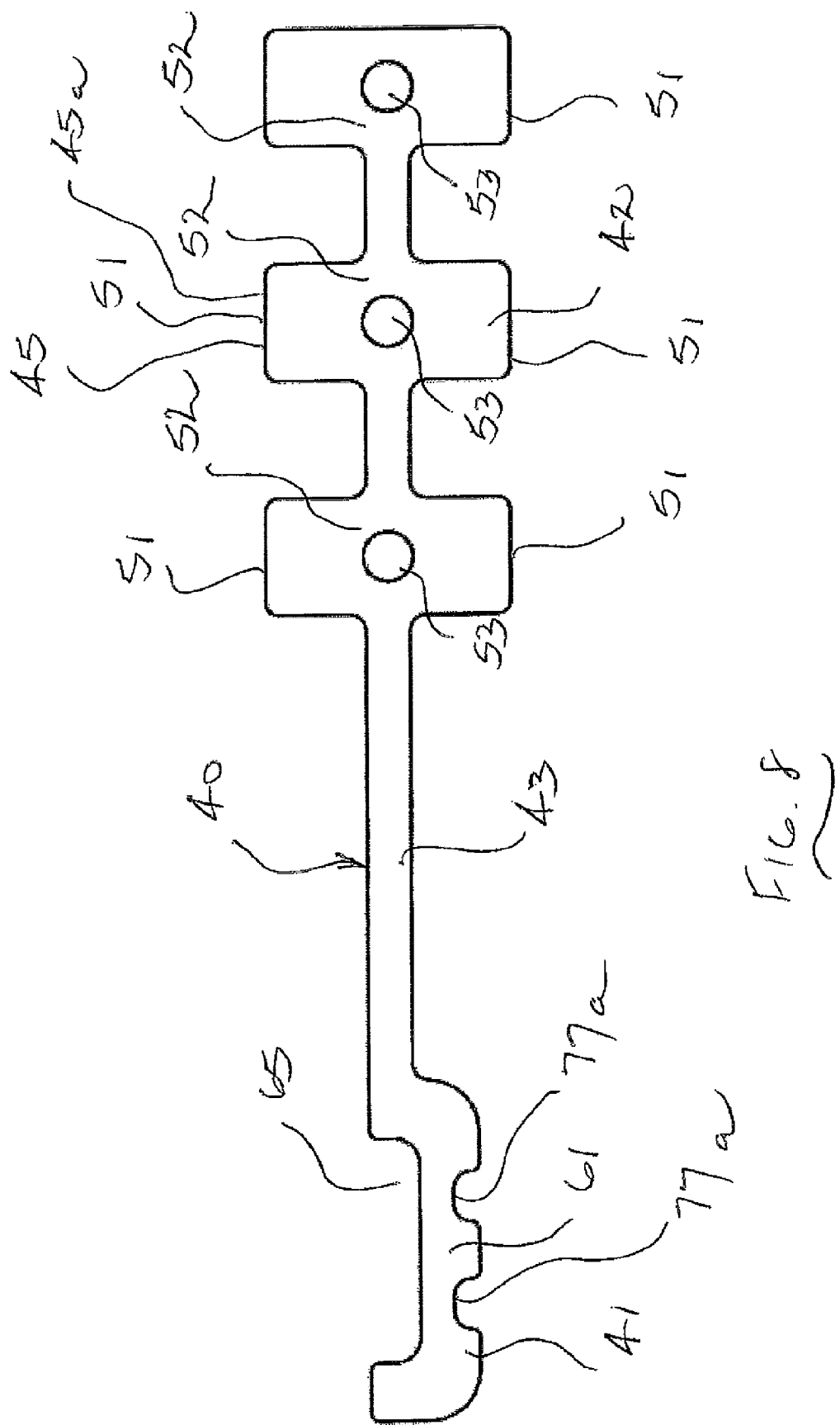
FIG. 8 is an end view of one part of the lateral longitudinal portion depicted in FIG. 7.

In the arrangement shown, each side 45a, 45b of the belt 45 has three ribs 51 adapted to locate in counterpart grooves in the outer peripheries of the pulley wheels 47. The ribs 51 on the opposed sides are arranged in sets 52, with each set comprising two ribs in opposed relation, as best seen in FIGS. 6, 7 and 8.

Each lateral longitudinal portion 22 also incorporates one or more longitudinal tensile elements 53 to resist longitudinal loading exerted on the elongate structure 11. In the arrangement shown, the tensile elements 53 are incorporated in the guide portions 44. Specifically, tensile elements 53 are incorporated in the double-sided belt 45, with one tensile element disposed between each set 52 of opposed ribs 51, as best seen in FIG. 7.

In the arrangement illustrated, the intermediate section 43 of the elongate body 40 is configured as a web 55. The web 55 has drainage holes 57 at intervals along its length to facilitate drainage of fluid therethrough, as shown in FIG. 6.

Figure 3:
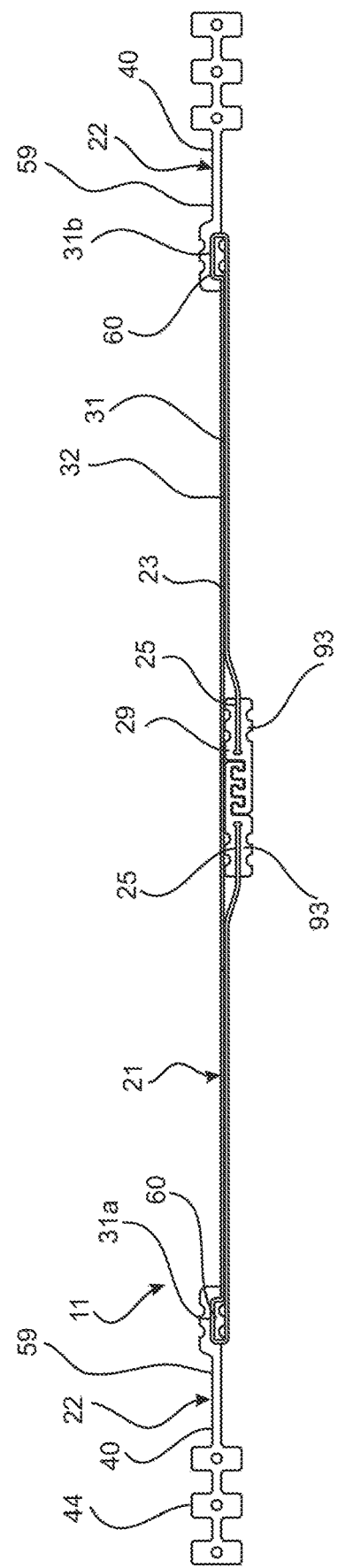
FIG. 3 is a cross-sectional view of the first embodiment of the elongate structure assembled into the tubular formation depicted in the collapsed condition.
Figure 4:
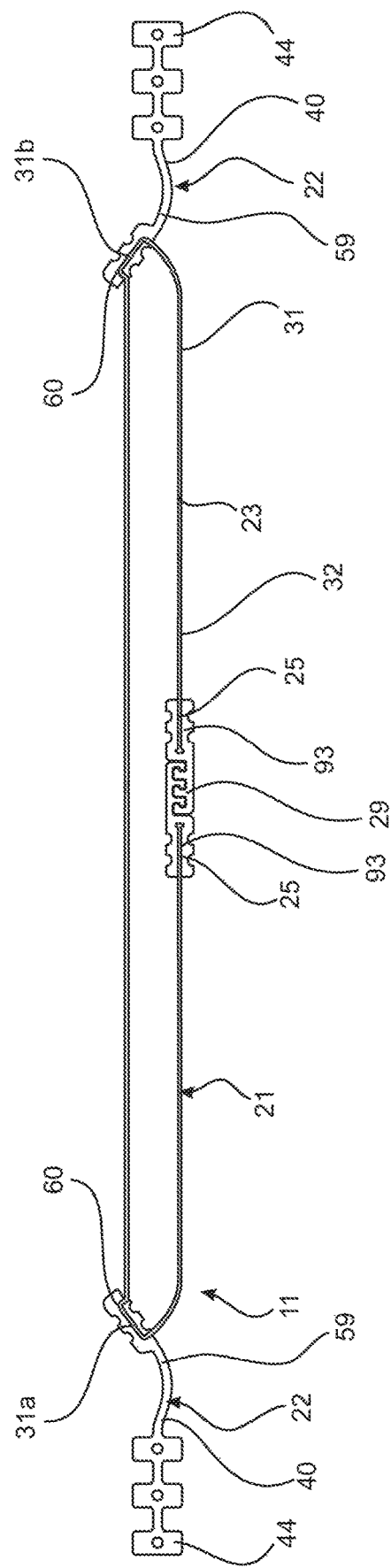
FIG. 4 is a view similar to FIG. 3, but showing the assembled tubular formation depicted in an expanded condition.

The intermediate section 43 is capable of flexing to accommodate angular movement between the two marginal edge sections 41, 42, as depicted in FIGS. 3 and 4. In the arrangement illustrated in which the intermediate section 43 is configured as web 55, the web may be flexible so as to function as a plastic hinge 59 to permit angular movement between the two marginal edge sections 41, 43.

The capacity to accommodate angular movement between the two marginal edge sections 41, 42 is advantageous as it accommodates angular movement of the junction between the respective lateral longitudinal portion 22 and the central longitudinal portion 21 upon assembly and disassembly of the tubular formation 23. It may also assist in cushioning vibration in the moving tubular formation 23 while carrying a load therein.

Preferably, the elongate body 40 is of unitary construction to provide the two opposed marginal edge sections 41, 42 and the intervening intermediate section 43 as a unit. The elongate body 40 of unitary construction may be formed in any appropriate way, such as for example by way of an extrusion process.

As mentioned above, marginal edge section 41 of the elongate body 40 is integrated with the central longitudinal portion 21. In this regard, marginal edge section 41 is configured as a joiner 60 comprising first and second joiner portions 61, 62 between which an associated portion 32a of the flexible material 32 is received and clamped. The first and second joiner portions 61, 62 can be secured together to provide an assembly 63.

Figure 9:
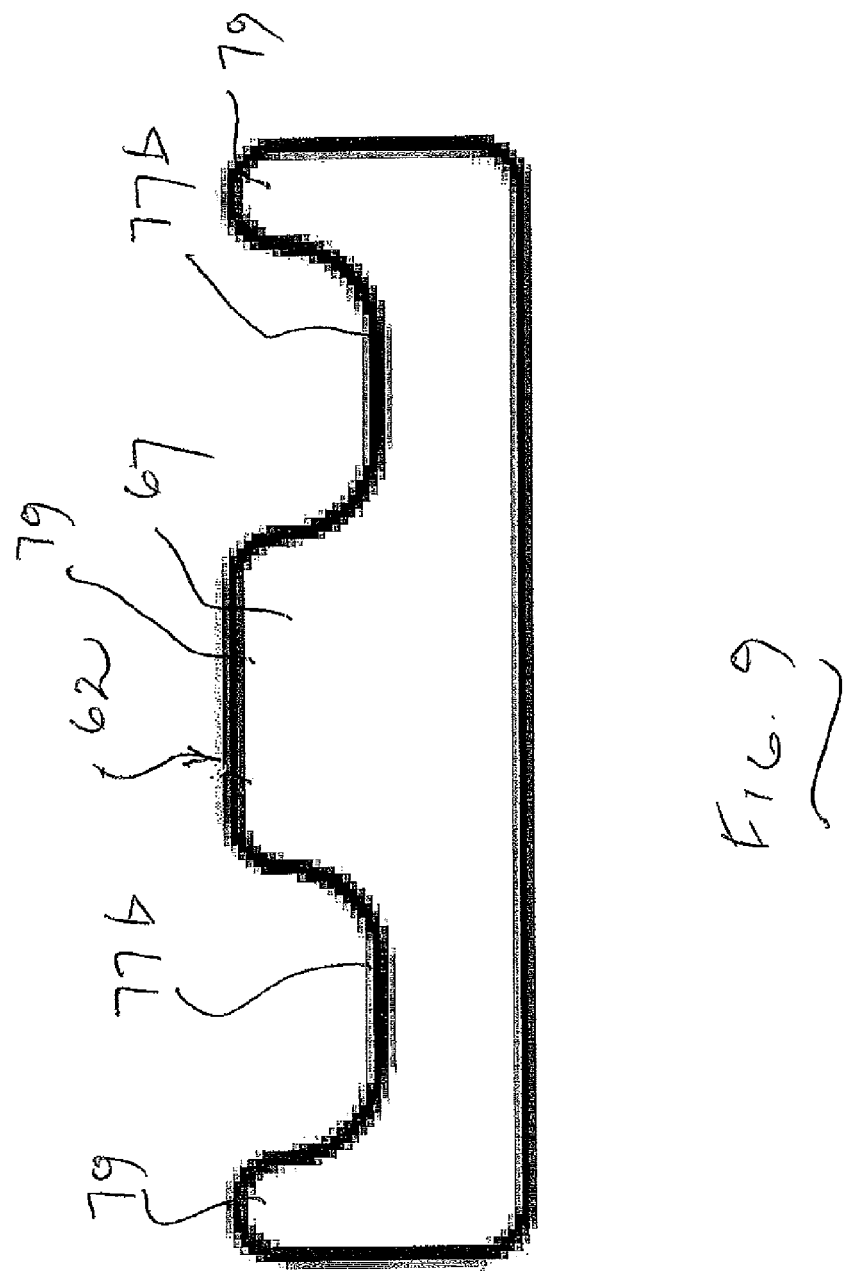
FIG. 9 is an end view of a further part of the lateral longitudinal portion depicted in FIG. 7.

The first joiner portion 61 defines a groove 65 integrated with the elongate body 40 (as best seen in FIG. 8), and the second joiner portion 62 comprises a counterpart strip 67 formed separately (as best seen in FIG. 9). The strip 67 is positioned on one side of the flexible material 32 at the intended point of attachment, and the strip 67 then inserted into the groove 65, moving the associated portion 32a of the flexible material 32 into the groove 65 and clamping it between the strip and the groove, as best seen in FIG. 6. Assembly and installation of the joiner 60 can then be completed by securing the first and second joiner portions 61, 62 to clamp the associated portion 32a of the flexible material 32 therebetweeen.

The first and second joiner portions 61, 62 are secured together to provide the assembly 63 by way of securing means 71.

The securing means 71 comprise fastening means 73 between the first and second joiner portions 61, 62.

In this embodiment, the fastening means 73 comprises a stitched joint comprising stitching 75, as shown in FIGS. 6 and 7. However, it should be appreciated that the fastening means 73 may comprise any other appropriate form of joint for joining the first and second joint portions, including, for example, a stapled joint, a riveted joint, a pinned joint, any other mechanically fastened joint, a bonded joint including a chemically-bonded joint, and a heat welded joint The fastening means 73 may comprise a joint extend continuously along at least a substantial part of the length of the assembly 63, or it may comprise a plurality of joint elements provided at intervals along at least a substantial part of the length of the assembly 63. In this embodiment, the stitching 75 extends substantially along the full length of the assembly 63 as a continuous line of stitching. In another embodiment, the stitching may comprises a series of discreet sections of stitching disposed at spaced apart intervals along at least a substantial part of the length of the assembly 63.

The fastening means 73 is accommodated in a protected condition with respect to either one or both of the first and second joiner portions 61, 62. In this embodiment, the fastening means 73 is recessed within the assembly 63, thereby being within the confines of the first and second joiner portions 61, 62. More particularly, the fastening means 73 is recessed within the assembly 63, with the assembly being provided with a longitudinally extending recess formation 77 in which the fastening means 73 is recessed. In this embodiment, the recess formation 77 comprises a channel.

In the arrangement shown, the assembly 63 is provided with two recess formations 77 on opposed sides of the assembly, with the fastening means 73 extending between the two recess formations; that is, there is one recess formation 77a on the first joiner portion 61 and another recess formation 77b on the second joiner portion, with the two recess formations 77a, 77b providing a pair.

The assembly 63 may be provided with more than one pair of recess formations 77. In the arrangement shown, there are two pairs of recess formations.

The recess formations 77 are defined between longitudinal ribs 79 provided on the first and second portions 61, 62. The ribs 79 are formed integrally with the first and second portions 61, 62. The ribs 79 may be profiled at their outer longitudinal edges; the profiling may, for example, comprise rounded longitudinal edges.

The arrangement involving one or more pairs of recessed formations 77 is useful in circumstances where the fastening means 73 comprises a stitched joint, as is the case in this embodiment, as the first and second joint portions 61, 62 can be stitched together along each pair 78 of joint formations. This facilitates rapid assembly and installation of the joiner 60, with the stitched joint(s) being protected (against, for example, abrasion) by virtue of being recessed within the confines of the joiner 60.

The first portion 61 and second portion 62 may be formed with the recess formations 77, such as for example by way of an extrusion process.

As discussed above, the central longitudinal portion 21 has two longitudinal edge sections 25 adapted to be releasably connected together for assembling the tubular formation 23 by the slidably interlocking connector 29.

The slidably interlocking connector 29 may comprise two connector elements 91 each adapted to be connected to a respective one of the two longitudinal edge sections 25 of the central longitudinal portion 21. The two connector elements 91 are each provided with a joiner 93 to establish a connection with a respective one of the longitudinal edge sections 25 of the central longitudinal portion 21. When so connected, the slidably interlocking connector 29 is integrated with the two longitudinal edge sections 25.

The two connector elements 91 each comprise an elongate body 94 having two opposed marginal edge sections 95, 97. One marginal edge section 95 of the elongate body is configured as a connector portion 98, and the other marginal edge section 97 configured and as the joiner 93.

The respective connector portions 98 of the two connector elements 91 are adapted for slidable interlocking engagement in a manner somewhat akin to a zipper. With this arrangement, the slidably interlocking connector 29 constitutes a flexible, continuous plastic zipper.

In this embodiment, the two connector portions 98 for interlocking engagement one with another are each identical. More particularly, the two connector elements 91 are identical. It is advantageous for the two connector elements 91 to be identical, as only one configuration of connector element need be produced, with that configuration being used for both of the two required connector elements. However, it should be understood that the two connector elements need not be identical or substantially similar, but nevertheless have complementary portions for interlocking engagement one with another.

In an arrangement of this embodiment in which the two connector elements 91 are identical, each connector portion 98 comprises an elongate connector body portion 99. The elongate connector body portion 99 comprises a plurality of longitudinal male portions 101 in laterally spaced relation and a plurality of longitudinal female portions 103. Each longitudinal female portion 103 is disposed adjacent a respective one of the longitudinal male portions 101, wherein the male portions 101 of each one of the connector portions 98 can be slidably received in counterpart female portions 103 of the other one of the connector portions 98, the arrangement being that the male portions 101 of the two connector portion 98 are disposed one adjacent another and in interlocking engagement, as shown in FIGS. 4, 10 and 11.

The elongate connector body portion 99 further comprises a base portion 105 supporting the plurality of longitudinal male portions 101 and from which the longitudinal male portions project.

Figure 10:
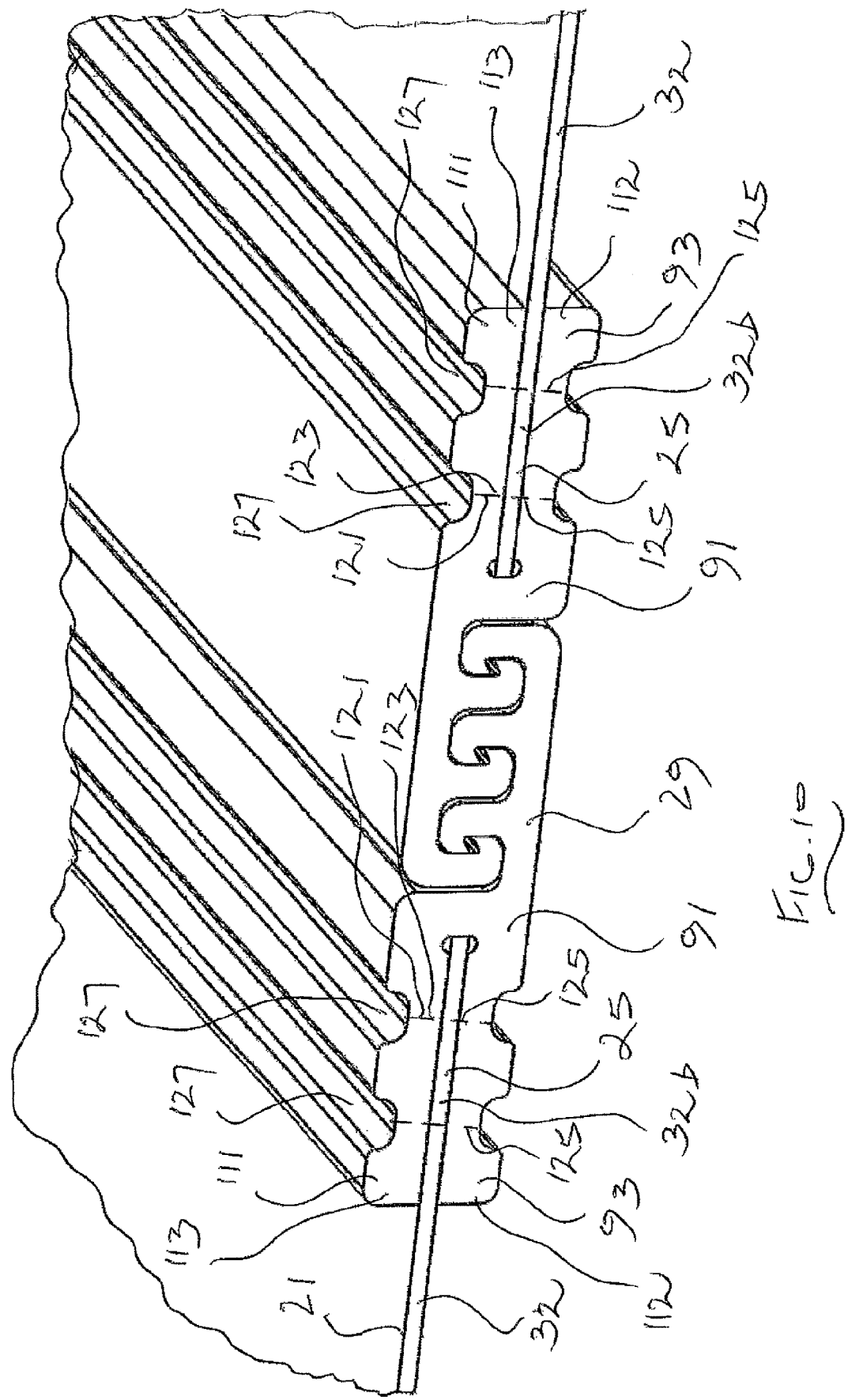
FIG. 10 is a cross-sectional fragmentary perspective view of the elongate structure, illustrating in particular the central longitudinal portion having a slidable interlocking connector.
Figure 11:
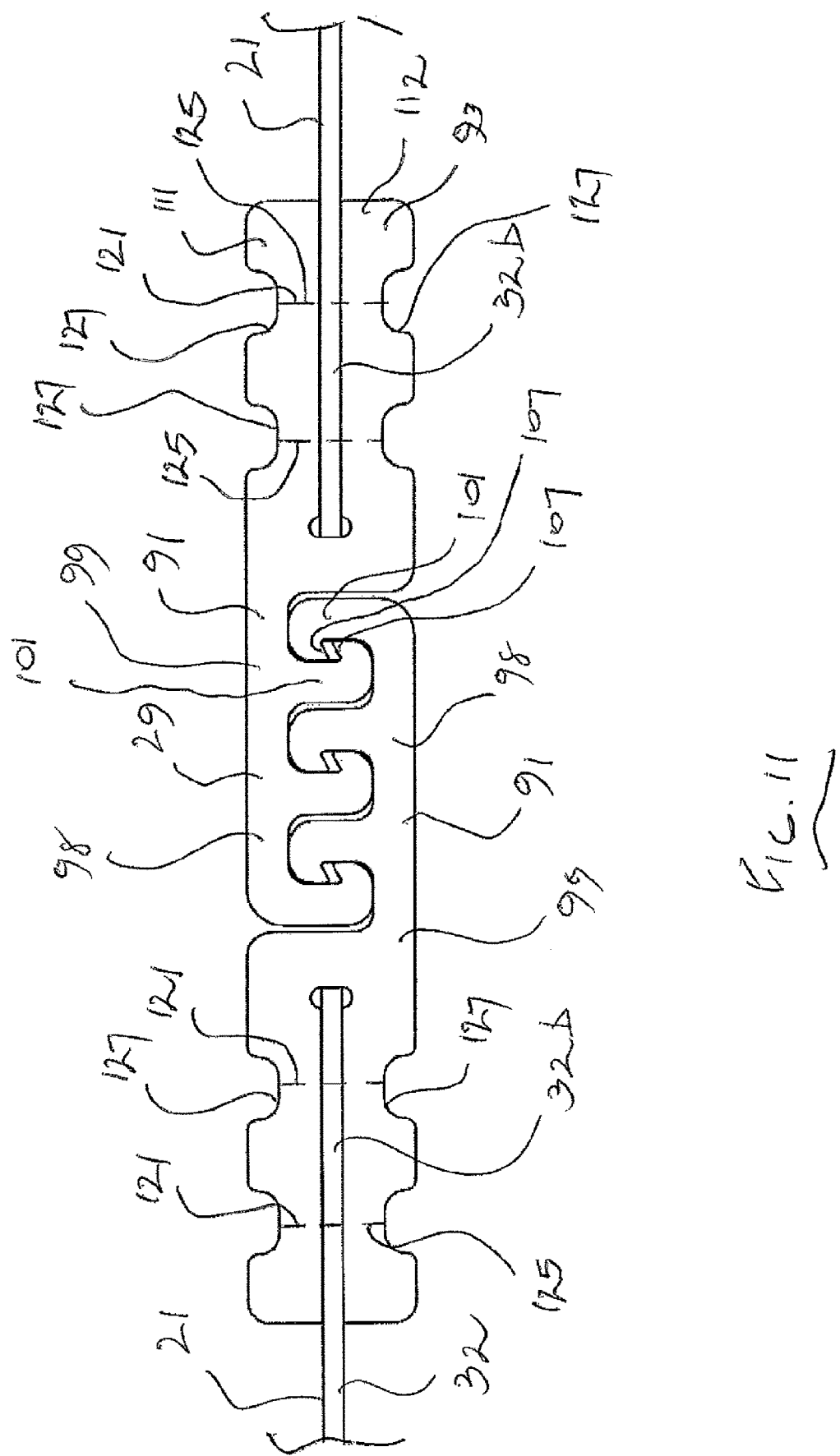
FIG. 11 is an end view of the arrangement shown in FIG. 10.

Each male portion 101 present a locking edge 107 extending into the adjacent female portion 103, whereby the locking edges 107 of each two counterpart male portions 101 in interlocking engagement engage one against the other to resist separation of the two interlocking connector elements, as shown in FIGS. 10 and 11.

The locking edge 107 on each male portion 101 extends inwardly into the adjacent female portion 103 in a direction towards the base portion 105 adjacent the female portion, as best seen in FIGS. 12 and 13. With this arrangement, the male portions 101 incorporating the locking edges 107 function somewhat as barbs, with each two counterpart male portions 101 in interlocking engagement by way of the barbs.

The male portions 101 are resiliently flexible laterally to facilitate insertion of the male portions of each one of the connector portions 98 in counterpart female portions 103 of the other one of the connector portions 98.

The slidably interlocking connector 29 progressively connects and disconnects the longitudinal edge sections 25 of the central longitudinal portion 21 as the tubular formation 23 is continuously assembled at one end 23a thereof and continuously disassembled at another end 23b thereof during movement of the elongate structure 11 along the path 12. Because of this, the two connector elements 91 are not in interlocking engagement over their entire lengths at any time, but rather have sections thereof in interlocking engagement along part of the length, with the interlocking commencing at about the assembly end 23a of the tubular formation 23 and terminating at about the disassembly end 23b of the tubular formation.

In relation to the marginal edge section 97 of the elongate body configured as the joiner 93, the latter comprises first and second joiner portions 111, 112 configured as two jaws between which an associated portion 32b of the flexible material 32 comprising the central longitudinal portion 21 may be inserted and clampingly engaged. The associated portion 32b of the flexible material 32 comprises one of the longitudinal edge sections 25 of the central longitudinal portion 21 to which the slidably interlocking connector 29 is connected. The first and second joiner portions 111, 112 can be secured together to provide an assembly 113.

The two jaws 111, 112 each have an inner side 115 presenting a clamping surface 117 for engaging the inserted portion 32b of the flexible material 32 and an outer side 119.

Assembly and installation of the joiner 93 can then be completed by securing the two jaws 111, 112 together to clamp the associated portion 32ba of the flexible material 32 therebetweeen.

The two jaws 111, 112 are secured together to provide the assembly 113 by way of securing means 121.

The securing means 121 comprise fastening means 123 between the two jaws 111, 112.

In this embodiment, the fastening means 123 comprises a stitched joint comprising stitching 125, as shown in FIGS. 10 and 11. However, it should be appreciated that the fastening means 123 may comprise any other appropriate form of joint for joining the first and second joint portions, including, for example, a stapled joint, a riveted joint, a pinned joint, any other mechanically fastened joint, a bonded joint including a chemically-bonded joint, and a heat welded joint The fastening means 123 may comprise a joint extend continuously along at least a substantial part of the length of the assembly 113, or it may comprise a plurality of joint elements provided at intervals along at least a substantial part of the length of the assembly 113. In this embodiment, the stitching 125 extends substantially along the full length of the assembly 113 as a continuous line of stitching. In another embodiment, the stitching may comprises a series of discreet sections of stitching disposed at spaced apart intervals along at least a substantial part of the length of the assembly 113.

The fastening means 123 is accommodated in a protected condition with respect to either one or both of the first and second joiner portions 111, 112. In this way, the stitched joint, or other fastening means as the case may be, are not exposed to, or are at least somewhat protected from, an adverse condition arising on the exposed side of the slidably interlocking connector 29 which might, for example, cause abrasion or wear.

In this embodiment, the fastening means 123 is recessed within the assembly 113, thereby being within the confines of the first and second joiner portions 111, 112. More particularly, the fastening means 123 is recessed within the assembly 113, with the assembly being provided with a longitudinally extending recess formation 127 in which the fastening means 123 is recessed. In this embodiment, the recess formation 127 comprises a channel.

In the arrangement shown, the assembly 113 is provided with two recess formations 127 on opposed sides of the assembly 113, with the fastening means 123 extending between the two recess formations 127; that is, there is one recess formation 127a on jaw 111 and another recess formation 127b on jaw 112.

The recess formations 127 on the two jaws 111, 112 are provided as counterparts which function as a pair. The assembly 113 may be provided with more than one pair of recess formations 127. In the arrangement shown, there are two pairs of recess formations.

The recess formations 127 are defined by channels 131 provided on the respective outer sides 119 of the jaws 111, 112.

The arrangement involving one or more pairs of recessed formations 127 is useful in circumstances where the fastening means 123 comprises a stitched joint, as is the case in this embodiment, as the first and second joint portions 61, 62 can be stitched together along each pair 128 of joint formations. This facilitates rapid assembly and installation of the joiner 93, with the stitched joint(s) being protected (against, for example, abrasion) by virtue of being recessed within the confines of the joiner 93.

The jaws 111, 112 may be formed with the recess formations 127, such as for example by way of an extrusion process.

The two jaws 111, 112 may be biased into an open condition for insertion of the associated portion 32b of flexible material 32 and adapted to be closed upon the inserted portion 32b of the flexible material 32 when the securing means 121 is installed, with the securing means functioning to secure the two jaws 111, 112 together to clamp the inserted portion 32b of the flexible material therebetween.

Preferably, the elongate body 94 of each connector element 91 is of unitary construction to provide the two opposed marginal edge sections 95, 97 as a unit. The elongate body 94 of unitary construction may be formed in any appropriate way, such as for example by way of an extrusion process.

As mentioned above, guide structures 13 are provided for guiding the endless elongate structure 11 along the path 12. The guide structures 13 comprises the pulleys structures 14 over and around which the elongate structure 11 can pass and the guide track structures 16 for maintaining the guiding movement of the elongate structure 11 to maintain its alignment and position along the path 12.

The guide portion 44 of each lateral longitudinal portion 22 of the elongate structure 11 is provided for guiding movement of the elongate structure 11 along its path The guide portion 44 is configured as belt 45 for engagement with the guide structures 13 positioned at intervals along the path 12 of movement of the elongate structure 11.

Each pulley wheel 47 has an outer periphery 47a configured to guidingly receive a respective belt 45. In the arrangement shown, the outer peripheries 47a are configured as rims having peripheral grooves in which the belt ribs 51 run.

The pulley structures 14 may be configured as squirrel cage roller assemblies 141, as best seen in FIGS. 14, 15 and 16.

The pulley structures 14 may each further comprise one or more dispersing shovels 143 nested within the squirrel cage roller assembly 141. The dispersing shovels 143 are configured to inhibit material (filtrate), which is expelled or otherwise discharged from the tubular formation 23, from accumulating on, or running down, the tubular formation. In the arrangement shown, the dispersing shovels 143 are of channel configuration. As the squirrel cage roller assembly 141 rotates, the dispersing shovels 143 scoop up the expelled material (filtrate) and utilise gravity to discharge it outwardly through the squirrel cage roller assembly.

The dispersing shovels 143 are of tapered configuration, being wider toward the ends 145 than in the centre 147, as there is likely more filtrate flow towards the outer edges than at the centre of the squirrel cage roller assembly 141.

The guide track structures 16 each comprise a guide body 151 defining a guide passage 153 through which the belt ribs 51 run, as shown in FIG. 14. In the arrangement shown, the guide passage 153 is of elongate configuration.

With this arrangement, guide track structures 16 serve to constrain sideways movement of the lateral longitudinal portions 22 of the elongate structure 11 and thereby maintain the intended alignment and position of the lateral longitudinal portions 22 along the path 12. In particular, the guide track structures 16 serve to maintain the lateral longitudinal portions 22 in position in correctly spaced apart relation with respect to each other and also moving in a correct direction of travel. In particular, the guide track structures 16 serve to resist unintended lateral (sidewards) movement of the lateral longitudinal portions 22 as the elongate structure 11 travels along the path 12; for example, the guide track structures 16 serve to resist the lateral longitudinal portions 22 being drawn towards each other in an unintended manner (say when the elongate structure 11 is in a loaded condition) and also resist unintended sideways spreading of the lateral longitudinal portions 22 being drawn towards each other as the elongate structure 11 travels along the path 12.

The peripheral grooves in the outer periphery 47a of each pulley wheel 47 may be wider than the counterpart ribs 51 on the belt 45 so as to permit some limited lateral (sideways) movement, permitting contraction of the tubular formation 23 as it fills with feed material.

Referring to FIG. 1, the circulating path 12 includes an assembly zone 171 at which the longitudinal edge sections 25 of the central longitudinal portion 21 are brought together and interconnected by way of the slidably interlocking connector 29 to form the tubular formation 23, and a disassembly zone 173 at which the slidably interlocking connector 29 is released to separate the longitudinal edge sections 25 and the tubular structure 21 subsequently opened.

Feed material is introduced into the open end of the tubular formation at or adjacent the assembly zone 171.

The assembly zone 171 includes a slider 176 which operates in conjunction with the two connector elements 91 to move them together into zipping engagement as the endless structure 11 circulates around path 12.

The disassembly zone 173 includes a splitter 177 operable to progressively pull the two connector elements 91 apart in an unzipping action as the endless structure 11 circulates around path 12.

With this arrangement, the longitudinal edge sections 25 of the central longitudinal portion 21 are continuously connected together at the assembly station 173, and the interconnected longitudinal edge sections 25 are continuously separated at the disassembly zone 173 so as to split the tubular formation 23 as the endless structure 11 circulates around the path 12.

Figure 5:
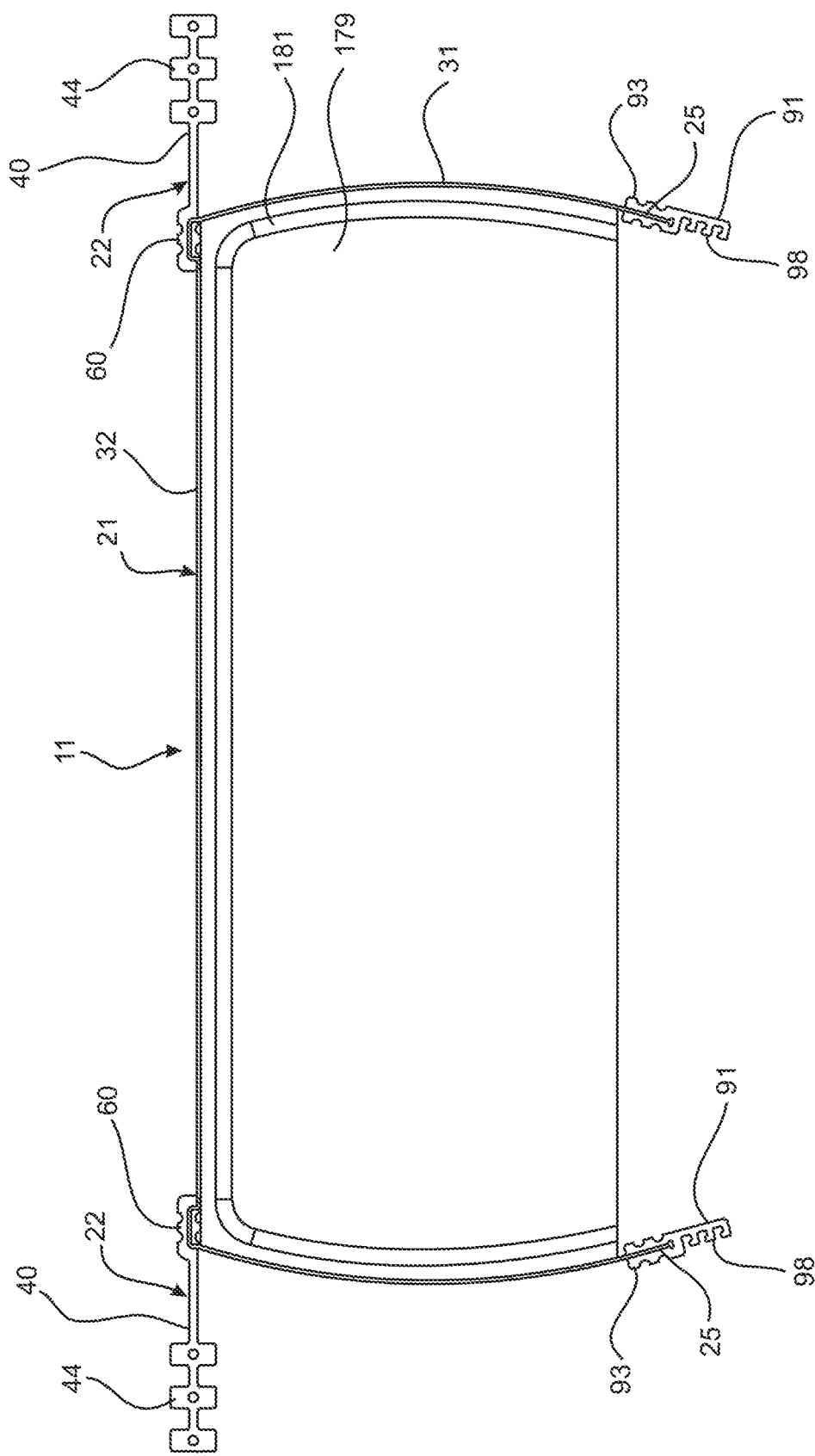
FIG. 5 is a cross-sectional view of the elongate structure in a disassembled condition.

At the disassembly zone 173, the splitter 177 acts to progressively unfurl the flexible tube 31 from the closed condition forming the tubular formation 23 to the condition in which it is open. In the arrangement shown in FIG. 5, the splitter 177 comprises scraper 179 presenting an edge 181 over which the inner surface 31a of the flexible tube 31 passes, with the edge 181 being configured to cause the interconnected longitudinal edge sections 25 of the approaching flexible tube 31 to separate. In other words, the scraper 179 functions as a guide arrangement for progressively moving the flexible tube 31 from the closed condition forming the tubular formation 23 to the condition in which it is open such that the inner surface 31*a* of the flexible tube 31 is exposed. The scraper edge 181 also serves to scrape remnant dewatered sludge material from the inner surface 31*a* of the flexible tube 31. The scraper 179 presents a surface at edge 181 for sliding contact with the inner surface 31*a* of the flexible tube 31 to maintain it in a taut condition as is unfurls from the closed condition to the open condition, thereby avoiding folds or wrinkles in the unfurling flexible tube 31.

With this arrangement, the scraper 179 is pressed into the flexible tube 31 as it unfurls from the closed condition forming the tubular formation 23 to the condition in which it is open.

The scraper 179 is pressed into the flexible tube 31 as the latter unfurls from the closed condition forming the tubular formation 23 to the open condition, with edge 181 in sliding contact with the inner surface 31*a* of the flexible tube 31 so that the flexible tube 31 is maintained in a taut condition as is it unfurls from the closed condition to the open condition.

In the first embodiment described above, the central longitudinal portion 21 is of integrated construction; that is, it is formed as a unitary structure having the two longitudinal edge sections 25 adapted to be connected one to the other to provide the tubular formation 23. With this arrangement, there is only one slidably interlocking connector 29. The slidably interlocking connector 29 comprises two connector elements 91, each adapted to be connected to a respective one of the two longitudinal edge sections 25 of the central longitudinal portion 21. The two connector elements 91 are each provided with the respective joiner 93 to establish a connection with the respective longitudinal edge section of the central longitudinal portion 21. When so connected, the slidably interlocking connector 29 is integrated with the two longitudinal edge sections.

However, the central longitudinal portion 21 need not necessarily be of integrated construction; that is, it need not be formed as a single unit unitary structure. The central longitudinal portion 21 may, for example, comprises two or more discrete longitudinal parts adapted to be releasably connected one to another to provide the tubular formation 23. Such an arrangement is the subject of a second embodiment which will now be described.

Referring to FIGS. 17 and 18, there is shown endless elongate structure 11 comprising central longitudinal portion 21 and two lateral longitudinal portions 22 on opposed sides of the central longitudinal portion for supporting the central longitudinal portion therebetween, as is the case with the first embodiment. The central longitudinal portion 21 is adapted to be assembled into movable tubular formation 23, which is adapted to be continuously assembled at one end thereof and continuously disassembled at another end thereof during movement of the elongate structure 11, again as is the case with the first embodiment.

In this second embodiment, the central longitudinal portion 21 comprises a plurality of discrete longitudinal parts 190. In the arrangement shown, there are two discrete longitudinal parts 190, which are identified by reference numerals 191, 192 respectively. There could, however, be more than two discrete longitudinal parts 190 in other embodiments.

Each discrete longitudinal part 191, 192 has two opposed longitudinal edge sections 193. The arrangement is such that the discrete longitudinal parts 191, 192 can be disposed one alongside the other to assemble the tubular formation 23, with adjacent longitudinal edge sections 193 of the discrete longitudinal parts being interconnected by respective slidably interlocking connectors 29, as shown in FIG. 17. Accordingly, in the arrangement shown (in which there are two discrete longitudinal parts 191, 192), there are two slidably interlocking connectors 29*a*, 29*b*.

The two slidably interlocking connectors 29*a*, 29*b* each comprise two connector elements 91, with each connector element being adapted to be connected to a respective one of the two adjacent longitudinal edge sections 193. More particularly, slidably interlocking connector 29*a* comprises two connector elements 91*a*, and slidably interlocking connector 29*b* comprise two connector elements 91*b*. Connector elements 91*a* are joined one to adjacent longitudinal edge section 193 of longitudinal part 191, and the other to adjacent longitudinal edge section 193 of longitudinal part 192, as shown in FIG. 18. Similarly, connector elements 91*b* are joined one to adjacent longitudinal edge section 193 of longitudinal part 191 and the other to adjacent longitudinal edge section 193 of longitudinal part 192, also as shown in FIG. 18.

Each of the longitudinal part 191, 192 may be configured as a circulating structure (such as a belt) which can travel along its own path, with the two paths being configured to bring the longitudinal part 191, 192 into position one alongside the other for interconnection by way of the slidably interlocking connectors 29*a*, 29*b* to provide the tubular formation 23, as shown in FIG. 17. In the arrangement shown, the longitudinal part 191 is connected to the two lateral longitudinal portions 22, thereby providing an integrated structure 195. The longitudinal part 192 is formed as a separate unit from integrated structure 195.

Constructing the central longitudinal portion 21 as a plurality of discrete longitudinal parts 190 may allow for an increase in size of the endless elongate structure 11 in terms of the spacing between the two lateral longitudinal portions 22. This may be beneficial in terms of the volumetric load-carrying capacity of the tubular formation 23 and hence the load-carrying capacity of the endless elongate structure 11.

While the present invention has been described in terms of preferred embodiments in order to facilitate better understanding of the invention, it should be appreciated that various modifications can be made without departing from the principles of the invention. Therefore, the invention should be understood to include all such modifications within its scope. It should be appreciated that the scope of the invention is not limited to the scope of the embodiments previously described. In particular, it should be appreciated that the apparatus according to the invention may have applications in various fields for filtering material having liquid and solid components and is not restricted to the treatment of sewage.

Additionally, it should be understood that apparatus may be used for handling and/or treatment operation of any appropriate type, typical examples of which are described and illustrated in PCT/AU2007/000820, the contents of which are incorporated herein by way of reference.

By way of example, the operation may comprise a treatment operation in which material contained within the tubular formation is subjected to a treatment fluid, which may comprise treatment liquid or gas. The treatment fluid may pass through a wall of the tubular formation to contact material contained therein.

Further, a treatment operation may comprise a crushing operation in which target material contained within the tubular formation is subjected to a crushing action.

Further, the operation may comprise a materials handing operation or goods handing operation; for example, transportation of material contained within the tubular formation from one location to another. The two locations can be locations at any appropriate disposition relative to each other, including at different elevations or at approximately the same level.

This may be used to transfer target material, such as for example sludge material, from one location to another without necessarily also exposing the material to a treatment process.

Reference to positional descriptions, such as "upper", "lower", "top" and "bottom", are to be taken in context of the embodiment depicted in the drawings, and are not to be taken as limiting the invention to the literal interpretation of the term but rather as would be understood by the skilled addressee.

Additionally, where the terms "system", "device", and "apparatus" are used in the context of the invention, they are to be understood as including reference to any group of functionally related or interacting, interrelated, interdependent or associated components or elements that may be located in proximity to, separate from, integrated with, or discrete from, each other.

Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. An elongate structure movable along a path, the elongate structure having a central longitudinal portion, two lateral longitudinal portions on opposed sides of the central longitudinal portion for supporting the central longitudinal portion therebetween, and a joiner providing a connection between flexible material comprising the central longitudinal portion and one of the lateral longitudinal portions, the joiner comprising first and second joiner portions between which an associated portion of the flexible material is received and clamped, said one lateral longitudinal portion comprising an elongate body having two opposed marginal edge sections, one marginal edge section being configured as the joiner and the other marginal edge section being configured as a guide portion for guiding movement of the elongate structure along said path, the guide portion having two opposed sides for guiding movement of the elongate structure along the path, each opposed side comprising a plurality of guide ribs.

2. The elongate structure according to claim 1, wherein there are two joiners, each joiner providing a connection between the flexible material comprising the central longitudinal portion and a respective one of the two lateral longitudinal portions.

3. The elongate structure according to claim 1, wherein the guide ribs on the opposed sides are arranged in sets, each set comprising two ribs in opposed relation.

4. The elongate structure according to claim 1, wherein each lateral longitudinal portion comprises at least one longitudinal tensile element to resist longitudinal loading exerted on the elongate structure.

5. The elongate structure according to claim 4, wherein one longitudinal tensile element is provided between the two opposed guide ribs of each set.

6. The elongate structure according to claim 1, wherein the central longitudinal portion is adapted to be assembled into a movable tubular formation, the tubular formation being adapted to be continuously assembled at one end thereof and continuously disassembled at another end thereof during movement of the elongate structure along the path, wherein the central longitudinal portion has longitudinal edge sections adapted to be releasably connected together for assembling the tubular formation by a slidably interlocking connector.

7. The elongate structure according to claim 1, wherein the central longitudinal portion is configured as a flexible tube adapted to be split longitudinally for assembly and disassembly into and from the tubular formation, with respective longitudinal side sections of the tube being connected to the two lateral longitudinal portions.

8. The elongate structure according to claim 1, wherein the first and second joiner portions are adapted to be secured together to clamp the associated portion of the flexible material therebetween.

9. The elongate structure according to claim 8, wherein the joiner further comprise securing means for securing the first and second joiner portions together to clamp the associated portion of the flexible material therebetween.

10. The elongate structure according to claim 9, wherein the securing means is accommodated in a protected condition with respect to either one or both of the first and second joiner portions.

11. The elongate structure according to claim 9, wherein the first and second joiner portions cooperate to provide a clamping assembly, and wherein the securing means is recessed within the clamping assembly.

12. The elongate structure according to claim 9, wherein the securing means comprises fastening means between the first and second joiner portions.

13. The elongate structure according to claim 12, wherein the fastening means comprises a stitched joint.

14. The elongate structure according to claim 11, wherein the clamping assembly is provided with a longitudinally extending recess formation in which the securing means is recessed.

15. The elongate structure according to claim 14, wherein the clamping assembly is provided with two recess formations on opposed sides of the clamping assembly, with the fastening means extending between the two recess formations.

16. The elongate structure according to claim 1, wherein the first portion defines a groove and the second portion defines a counterpart strip, the groove being configured to receive the strip.

17. The elongate structure according to claim 16, wherein the first portion defining the groove is integrated in each lateral longitudinal portion.

18. The elongate structure according to claim 1, wherein the guide portion is configured as a belt for engagement with a guide structure.

19. The elongate structure according to claim 1, wherein the elongate body further comprises an intermediate section between the two opposed marginal edge sections, the intermediate section being capable of flexing to accommodate angular movement between the two marginal edge sections.

20. The elongate structure according to claim 19, wherein the elongate body is of unitary construction to provide the two opposed marginal edge sections and the intervening intermediate section as a unit.

21. An apparatus for performing an operation on matter, the apparatus comprising an elongate structure according to claim 1.

22. The apparatus according to claim 21, further comprising guide structures for guiding the elongate structure about an endless path.

23. The apparatus according to claim 22, wherein the guide structures comprise at least one pulley structure over or around which the elongate structure is movable.

24. The apparatus according to claim 22, wherein the guide structures comprise or further comprise at least one guide track structure for guiding movement of the elongate structure.

25. The apparatus according to claim 23, wherein said at least one pulley structure comprises peripheral grooves configured to receive the guide ribs on one side of the respective guide portion of the elongate structure, the peripheral grooves and guide ribs being so sized as to permit some lateral movement therebetween.

26. An apparatus for performing an operation on matter, the apparatus comprising an elongate structure, and guide structures for guiding the elongate structure about an endless path, wherein the elongate structure comprises a central longitudinal portion and two lateral longitudinal portions on opposed sides of the central longitudinal portion for supporting the central longitudinal portion therebetween, each lateral longitudinal portion comprising an elongate body having two opposed marginal edge sections, one marginal edge section being connected to the central longitudinal portion and the other marginal edge section being configured as a guide portion for guiding movement of the elongate structure along the endless path, the guide portion having two opposed sides for guiding movement of the elongate structure along the path, each side comprising a plurality guide ribs, and wherein the guide structures comprises at least one pulley structure over or around which the elongate structure is movable, the pulley structure comprising a plurality of peripheral grooves configured to receive the guide ribs on one side of the respective guide portion of the elongate structure, the peripheral grooves and guide ribs being so sized as to permit some lateral movement therebetween.

\* \* \* \* \*